(12) United States Patent
Kessman et al.

(10) Patent No.: US 9,896,549 B2
(45) Date of Patent: Feb. 20, 2018

(54) HYDROPHOBIC AND OLEOPHOBIC COATINGS

(76) Inventors: Aaron Kessman, Westover, WV (US); Darran Cairns, Morgantown, WV (US)

(\*) Notice: Subject to any disclaimer, the term of this patent is extended or adjusted under 35 U.S.C. 154(b) by 180 days.

(21) Appl. No.: 13/086,305

(22) Filed: Apr. 13, 2011

(65) Prior Publication Data

US 2011/0250422 A1  Oct. 13, 2011

Related U.S. Application Data

(60) Provisional application No. 61/342,360, filed on Apr. 13, 2010.

(51) Int. Cl.
| | | |
|---|---|---|
| *C09D 183/00* | (2006.01) | |
| *C08G 77/42* | (2006.01) | |
| *C23C 18/12* | (2006.01) | |
| *C08G 77/24* | (2006.01) | |

(52) U.S. Cl.
CPC ............ *C08G 77/42* (2013.01); *C23C 18/122* (2013.01); *C23C 18/1212* (2013.01); *C23C 18/1254* (2013.01); *C08G 77/24* (2013.01)

(58) Field of Classification Search
CPC ................ Y10T 428/24355; Y10T 428/24388
USPC ............ 428/220, 304.4, 305.5, 314.4, 315.5
See application file for complete search history.

(56) References Cited

U.S. PATENT DOCUMENTS

2002/0142242 A1\* 10/2002 Inoue .................. G03G 9/0827
430/110.3
2013/0108858 A1\* 5/2013 Biteau et al. ............. 428/304.4

FOREIGN PATENT DOCUMENTS

WO    WO 2007088312 A1 \*   8/2007

OTHER PUBLICATIONS

D. Grosso, et al; Two-Dimensional Hexagonal Mesoporous Silica Thin Films Prepared from Block Copolymers: Detailed Characterization and Formation Mechanism; *Chem. Mater.*, 2001, 13 (5), pp. 1848-1856.
R.E. Williford, et al; Mechanical stability of templated mesoporous silica thin films; *Microporous and Mesoporous Materials*, 2005, 85, pp. 260-266.
A.J. Kessman, et al; Tribology of water and oil repellent sol-gel coatings for optical applications; *Wear*, 2009, 267, pp. 64-618.

\* cited by examiner

*Primary Examiner* — Laura A Auer
(74) *Attorney, Agent, or Firm* — Thomas | Horstemeyer, LLP

(57) ABSTRACT

Provided according to some embodiments of the invention are hydrophobic and/or oleophobic silica-based coatings. In some embodiments of the invention, coatings may include a silica matrix having hydrophobic and/or oleophobic functionalized pores encapsulated therein. Also provided according to some embodiments of the invention are methods of forming a coating according to an embodiment described herein. In some embodiments, methods include (a) combining at least one silane and/or alkoxysilane and at least one fluoroalkylsilane and/or fluoroalkoxysilane with an alcohol, water and an acid to form a sol mixture; (b) adding a surfactant to the sol mixture to form a surfactant sol mixture; (c) depositing the surfactant sol mixture onto a substrate; and (d) curing the surfactant sol mixture to form a silica coating. Methods of preventing adhesion are also provided herein.

20 Claims, 21 Drawing Sheets

HYDROPHOBIC AND OLEOPHOBIC COATINGS

CROSS-REFERENCE TO RELATED APPLICATIONS

This application claims priority from U.S. Provisional Application Ser. No. 61/342,360, filed Apr. 13, 2010, the disclosure of which is hereby incorporated by reference herein in its entirety.

FIELD OF THE INVENTION

The present invention relates to coatings. More particularly, the present invention relates to coatings that may be oleophobic and/or hydrophobic.

BACKGROUND OF THE INVENTION

Hydrophobic-oleophobic functional materials are useful for a variety of applications, including restoration and improvement of architectural structures and urban infrastructure, industrial/anti-fouling, optoelectronics (photovoltaics, fibers, displays), automotive, textile, and household. The technology for imparting hydrophobic and oleophobic functionality to surfaces is mature, as evident by the wide variety of materials readily available for commercial and household use, many of which are based on fluoropolymers. The quality of water- and oil-repellency of materials is based on the chemical nature of the given material and its surface properties, with lower surface energies generally exhibiting non-wetting behavior.

Conventional hydrophobic-oleophobic and ultraphobic materials and surfaces typically suffer from low mechanical strength and/or low abrasion resistance. The weakness of PTFE, the most widely used hydrophobic-oleophobic material, is compounded by its low adhesive strength to substrates. To compound the problem, the damaged surfaces may be rendered even worse (more hydrophilic and easily wetted or soiled) than they were before functionalization. So-called superhydrophobic or self-cleaning materials represent the current state of the art when it comes to non-wetting behavior. These materials owe their properties to precise engineering of surface topography. Unfortunately, these materials may also not be adequately durable due to the fragility of the microstructured surface features.

To overcome these deficiencies, many researchers have turned to using sol-gel methods to apply a fluorinated organic monolayer to solid substrates or as monolayers atop hardened films. These may perform better than bulk fluoropolymers owing to the strong Si—O film-substrate bond achieved by sol-gel chemistry. Additionally, sol-gel may allow for high thermal stability and optical transparency. During film deposition the fluorinated organosilane moieties, which impart the low-energy surface, align at the solid-air interface because of their chemical nature—it is this very repellency that makes them useful. This surface stratification means that the functional moieties are not sufficiently incorporated into the bulk, so most, if not all, functional groups end up at the molecularly-thin region at the air interface. Although the chemical bond to the substrate is strong, the material as a functional coating still lacks durability because the surface monolayer is easily worn. Since they offer only transient protection, the ability of hydrophobic-oleophobic functional material to resist abrasive wear is an ongoing challenge that still prevents widespread use of these materials.

As such, it would be desirable to obtain self-cleaning materials that are more durable, robust and/or abrasion resistant that those currently available. Additionally, it would be advantageous to develop a coating that works independently of the substrate condition since it is not always possible or desired to texture the substrate surface

SUMMARY OF THE INVENTION

Provided according to some embodiments of the invention are coatings that include a silica matrix having hydrophobic and/or oleophobic pores encapsulated therein. In some embodiments of the invention, the hydrophobic and/or oleophobic pores include at least one alkyl and/or at least one fluoroalkyl functional group.

In some embodiments of the invention, the pores are disordered, and the hydrophobic and/or oleophobic pores include 30 to 60% by volume of the coating. Further, in some embodiments, the coating has a hardness in a range of 0.1 to 1.0 GPa, as determined by nanoindentation. In some embodiments, the coating has a thickness in a range of 200 to 700 nm.

In some embodiments of the invention, an exposed surface of the coating has an average contact angle before wear for water of greater than 70° and/or an average contact angle before wear for n-hexadecane of greater than 40°. In some embodiments, the average contact angle is maintained at greater than 70° for water and/or greater than 40° for hexadecane when the exposed surface of the coating is abraded up to 99% of the coating depth.

Also provided according to embodiments of the invention are methods of forming silica coatings. Such methods may include (a) combining at least one silane and/or alkoxysilane and at least one fluoroalkylsilane and/or fluoroalkoxysilane with an alcohol, water and an acid to form a sol mixture; (b) adding a surfactant to the sol mixture to form a surfactant sol mixture; (c) depositing the surfactant sol mixture onto a substrate; and (d) curing the surfactant sol mixture to foam a silica coating.

Also provided are methods of preventing adhesion to a substrate by coating the substrate with a coating according to an embodiment of the invention.

BRIEF DESCRIPTION OF THE FIGURES

The foregoing and other objects, features and advantages of the invention will become more apparent from the following more particular description of exemplary embodiments of the invention and the accompanying drawings. The drawings are not necessarily to scale, emphasis instead being placed upon illustrating the principles of the invention.

FIG. 5A shows film cured at 200° C. for 3 hours, and FIG. 5B a film cured at 400° C. for 24 hours. Both scale bars=20 nm.

FIGS. 10A and 10B are 2 mm scan areas of topography and friction, respectively, of film with composition xf=0.02/xs=6%.

FIGS. 10C and 10D are 2 mm scan areas of topography and friction, respectively, of film with composition xf=0.04/xs=10%.

FIGS. 10E and 10F are 500 nm scan areas of topography and friction, respectively, of the same film shown FIGS. 10C and 10D.

DETAILED DESCRIPTION OF EMBODIMENTS OF THE INVENTION

Figure 1:
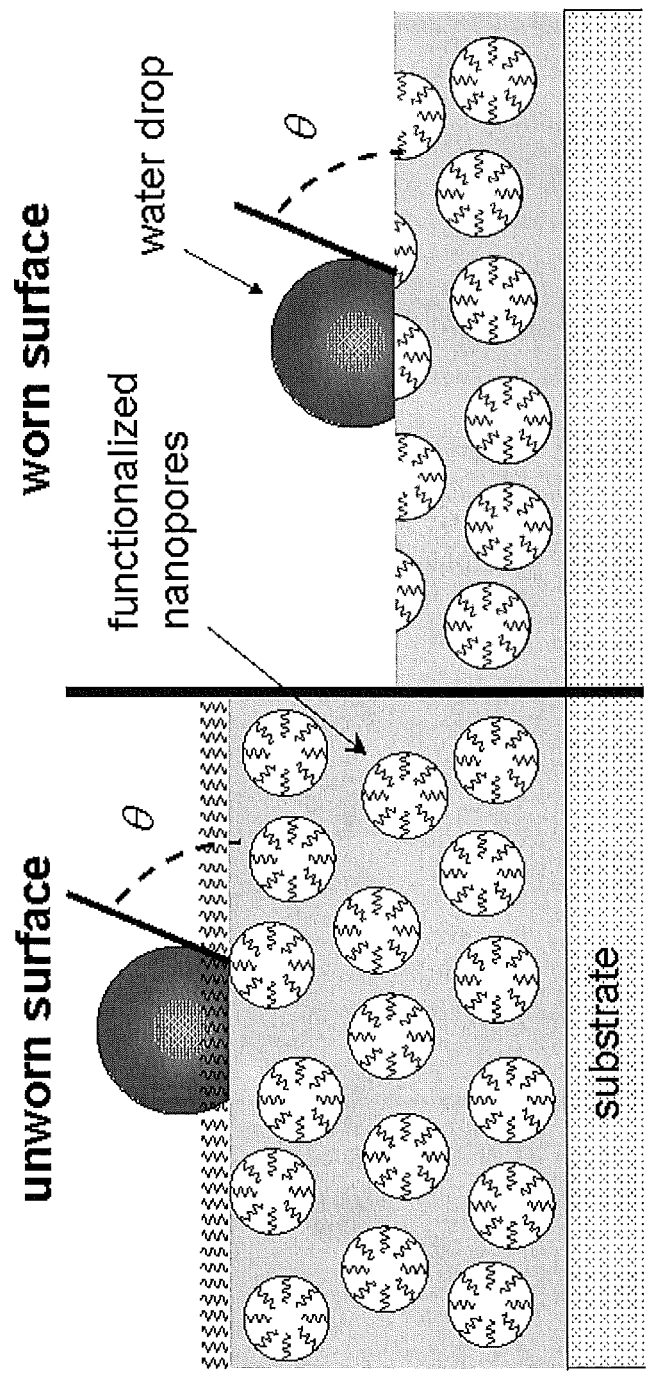
FIG. 1 provides a side-view of a schematic illustrating how a coating that encapsulates hydrophobic and/or oleophobic pores may maintain water and oil repellent properties after wear.

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

All patents, patent applications and publications referred to herein are incorporated by reference in their entirety. In the event of conflicting terminology, the present specification is controlling.

The embodiments described in one aspect of the present invention are not limited to the aspect described. The embodiments may also be applied to a different aspect of the invention as long as the embodiments do not prevent these aspects of the invention from operating for its intended purpose.

Chemical Definitions

As used herein the term "alkyl" refers to C1-20 inclusive, linear (i.e., "straight-chain"), branched, or cyclic, saturated or at least partially and in some cases fully unsaturated (i.e., alkenyl and alkynyl)hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. Exemplary branched alkyl groups include, but are not limited to, isopropyl, isobutyl, tert-butyl. "Lower alkyl" refers to an alkyl group having 1 to about 8 carbon atoms (i.e., a C1-8 alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to C1-5 straight-chain alkyls. In other embodiments, "alkyl" refers, in particular, to C1-5 branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl. As such, an alkyl group, as defined herein, may include an ether group.

The alkyl groups may be unsubstituted they may be substituted, provided that the substitution does not significantly deleteriously affect the surface energy of the alkyl group. A substituted alkyl is an alkyl, as defined herein, wherein one or more atoms or functional groups of the alkyl group are replaced with another atom or functional group, including for example, alkyl, substituted alkyl, ether, halogen, alkoxyl, hydroxyl, nitro, amino, alkylamino, dialkylamino, sulfate, and mercapto.

"Fluoroalkyl" refers to alkyl groups, as defined herein, wherein at least one atom of the alkyl is substituted with a fluorine atom. Typically, the fluorine atoms replaces one ore hydrogen atoms of the alkyl group. As with alkyl groups, the term "perfluoroalkyl" includes perfluoroethers.

"Alkoxyl" refers to an alkyl-O— group wherein alkyl is as previously described. The term "alkoxyl" as used herein can refer to, for example, methoxyl, ethoxyl, propoxyl, isopropoxyl, butoxyl, f-butoxyl, and pentoxyl. The term "oxyalkyl" can be used interchangeably with "alkoxyl". In some embodiments, the alkoxyl has 1, 2, 3, 4, or 5 carbons.

The term "amino" and "amine" refer to nitrogen-containing groups such as NR3, NH3, NHR2, and NH2R, wherein R can be alkyl, branched alkyl, cycloalkyl, aryl, alkylene, arylene, aralkylene. Thus, "amino" as used herein can refer to a primary amine, a secondary amine, or a tertiary amine.

The terms "halo", "halide", or "halogen" as used herein refer to fluoro, chloro, bromo, and iodo groups.

The term "hydroxyl" refers to the —OH group.

The term "mercapto" or "thio" refers to the —SH group. The term "silyl" refers to groups comprising silicon atoms (Si).

The term "silane" refers to any compound that includes four organic groups, such as including any of the organic groups described herein (e.g., alkyl, aryl and alkoxy), bonded to a silicon atom.

As used herein the term "alkoxysilane" refers to a silane that includes one, two, three, or four alkoxy groups bonded to a silicon atom. For example, tetraalkoxysilane refers to Si(OR)4, wherein R is alkyl. Each alkyl group can be the same or different. Alkoxysilanes, thus, also encompass "alkylalkoxylsilanes," wherein one or more of the alkoxy groups has been replaced with an alkyl group. Thus, an alkylalkoxysilane comprises at least one alkyl-Si bond.

Hydrophobic and/or Oleophobic Coating Materials

Provided according to some embodiments of the invention are hydrophobic and/or oleophobic silica-based coatings. In some embodiments of the invention, coatings may include a silica matrix having hydrophobic and/or oleophobic functionalized pores encapsulated therein. FIG. 1 shows a schematic of a porous functionalized film. The interior walls of the pores are functionalized so that, even after abrasive wear, the exposed surface retains its non-wetting functionality.

As used herein, the term "hydrophobic and/or oleophobic pore" refers to pores within the silica matrix that contain functional groups that are hydrophobic and/or oleophobic. The hydrophobic and/or oleophobic groups that are encapsulated in the pores may or may not be covalently bound to the silica that defines the pores.

The pores in the silica may have any suitable size and shape. In some embodiments, the pores are "closed cell" such that the encapsulation produces pores that are not interconnecting, or predominantly non-interconnecting. In some embodiments, the pores may be open cell, such that a majority, most or all of the pores are interconnecting. In some embodiments, 95 to 99% of the pores are closed cell. In some embodiments of the invention, the average pore diameter is in a range of 1 nm to 50 nm, and in particular embodiments, in a range of 3 to 12 nm.

In addition, the pores may be included in the coating in any suitable distribution. In some embodiments, the pores are considered "disordered," which, as used herein, means that the coating exhibits no discernable diffraction peak in the range of 0 to 10° on the 2θ scale as determined by X-ray diffraction. In some cases, coatings with disordered pores may be harder than ordered structures. In some embodiments, although the pores are considered disordered by definition described above, they may appear macroscopically uniform. Furthermore, in some embodiments of the invention, the pores may be ordered, and in some such cases, the pores may also appear macroscopically uniform throughout the coating.

Any suitable hydrophobic and/or oleophobic functional groups may be encapsulated in the pores in the silica matrix. In some embodiments, the hydrophobic and/or oleophobic functional groups include a hydrophobic and/or oleophobic alkyl group that has 6 or more carbon atoms, and in some cases, 8 or more carbon atoms. In some embodiments, the hydrophobic and/or oleophobic functional groups include a fluoroalkyl group, such as a C2-C20 fluoroalkyl group. Examples of fluoroalkyl groups include unsubstituted fluoroalkyl chains, straight chain and branched fluoroether groups. In some cases, the molecular weight of the fluoroalkyl functional group is in a range of 400 to 3000 g/mol. In some embodiments, the hydrophobic and/or oleophobic alkyl and/or fluoroalkyl groups may be multifunctional, meaning that one compound may react (condense) at two or more different portions of the molecule, which may result in bridging or tethering hydrophobic and/or oleophobic alkyl and/or fluoroalkyl groups. In some embodiments, amide bonds may be introduced into the hydrophobic and/or oleophobic alkyl and/or fluoroalkyl chain in order to enhance intermolecular stability. In some embodiments, the ratio of the hydrophobic and/or oleophobic alkyl to fluoroalkyl groups is in a range of 0 to 10:1. The coating may also include other alkyl groups that are included throughout the silica matrix, and may also be encapsulated in the pores. Examples include methyl, ethyl, propyl groups.

Any suitable coating thickness may be used. However, in some embodiments of the invention, the coating has a thickness in a range of 100 nm to 1 micron. In particular embodiments, the coating may have a thickness in a range of 200 to 700 nm.

The coating may have any suitable hardness. However, in some embodiments of the invention, the hardness in a range of 0.1 to 1.0 GPa as determined by nanoindentation.

In some embodiments of the invention, the porosity of the coating is in a range of 30 to 60% by volume, and in some embodiments, the porosity is in a range of 50 to 60% by volume. As used herein, the term "porosity" does not mean that the pores are empty, but instead, at least some of the pores include the hydrophobic and/or oleophobic groups described herein. The porosity may be determined after the hydrophobic and/or oleophobic groups have been removed, as described in the examples below. However, the hydrophobic and/or oleophobic coatings according to the embodiments of the invention include at least some hydrophobic and/or oleophobic molecules or functional groups encapsulated therein. In some embodiments, the pores are completely filled with the hydrophobic and/or oleophobic moieties, and in some embodiments, the pores are not completely filled. For example, in some cases, the pores may be filled more than 50, 60, 70, 80, 90, 95 or 99% (by volume) with the hydrophobic and/or oleophobic functional groups or molecules.

As described above, coatings according to embodiments of the invention may be hydrophobic and/or oleophobic, both before wear and after the coating has abraded and worn. For example, in some embodiments, the coating has an average contact angle before wear for water of greater than 70° and/or an average contact angle before wear for n-hexadecane of greater than 40°. In some embodiments, the average contact angle before wear for water is greater than 100° and/or an average contact angle before wear for n-hexadecane is greater than 50°. The n-hexadecane may be used as a standard liquid for determining the oleophobicity of a coating. In some embodiments of the invention, the oleophobicity and/or hydrophobicity may be maintained as the coating is worn or abraded due to the oleophobic and/or hydrophobic functional groups encapsulated in the pores. In some cases, the average contact angle for water and/or average contact angle for n-hexadecane can be maintained above 70° and 40°, respectively, throughout the wearing of the coating. In some cases, the average contact angle for water and/or n-hexadecane may be maintained above 70° and 40°, respectively, as the coating is abraded up to 10, 20, 30, 40, 50, 60, 70, 80, 90 or 99% of the coating depth. In some cases, the contact angle many decrease slightly as the coating is abraded, but may the coating may still be suitably hydrophobic and/or oleophobic. In some cases, the average contact angle decreases up to 10%, 20% or 30% of its value before wear.

In some embodiments of the invention, the coating may also include residual surfactant, or other residual additives, that may be used to form the coatings.

Methods of Forming Coatings According to an Embodiment of the Invention

Also provided according to some embodiments of the invention are methods of forming a coating according to an embodiment described herein. In some embodiments, methods include (a) combining at least one silane and/or alkoxysilane and at least one fluoroalkylsilane and/or fluoroalkoxysilane with an alcohol, water and an acid to form a sol mixture; (b) adding a surfactant to the sol mixture to form a surfactant sol mixture; (c) depositing the surfactant sol mixture onto a substrate; and (d) curing the surfactant sol mixture to form a silica coating.

Any suitable alkoxysilane or silane may be used. Alkoxysilanes include matrix silanes or alkoxysilanes (e.g., examples include tetraethoxysilane and methyltriethoxypropyl silane, and the like) that are not particularly hydrophobic and/or oleophobic, and also the hydrophobic and/or oleophobic silanes and alkoxysilanes. Examples include silanes and alkoxysilanes that include long chain alkyl groups.

Any suitable fluoroalkylsilane and/or fluoroalkoxysilane many be used. An example is a perfluoropolyether silane (FPES, Fluorolink S10, Solvay Solexis).

Any suitable alcohol may be used. Examples of alcohols include methanol, ethanol, propanol, butanol, 2-ethoxyethanol and the like. Other solvents may also be present, for example, acetone, formamide, dimethylformamide, dioxane, tetrahydrofuran, and the like. Other additives include alcohols and/or alkanes in the range of C6-C18 and polymers like polyethylene glycol and polypropylene glycol. Other additives known to those of skill in the art may also be used in some cases.

Any suitable surfactant may be used. Examples include Pluronic F127 (MW=12600, PEO106, PPO70, PEO106 from BASF) and CTAB.

Any suitable synthetic process for forming coatings according to an embodiment of the invention may be used. However, in some embodiments, coatings described herein may be formed by the following method. First, the matrix alkoxysilane (e.g., TEOS) may be hydrolyzed with water and a small amount of acid, such as HCl, and for example, in the molar ratio 1-xfTEOS:4H2O:0.001HCl, wherein xf (molar concentration of the total hydrophobic and/or oleophobic silanes and alkoxysilanes, e.g., FPES, in terms of total silanes to be added) is in a range of 0.02 to 0.05. After stirring (e.g., for 60 minutes), a perfluoroethersilane (FPES) may be added and the sol stirred for 5 minutes to allow FPES hydrolysis. The sol may be diluted with the alcohol to achieve a final molar ratio of 1-xfTEOS:xfFPES:4H2O: 0.01HCl:20EtOH. The sol may then be stirred for an additional time (e.g., 24 hours) and filtered. The surfactant (F127) may then be added. After mixing to ensure homogeneity, the sols may be coated/deposited on a substrate (e.g., cleaned soda-lime glass microscope slides).

The substrate may be coated with a coating composition according to an embodiment of the invention by any suitable method. In some embodiments of the present invention, methods of coating the substrate include applying the coating to a device via dip-coating, spread-coating, spray coating, spin coating, brushing, imbibing, rolling and/or electrodeposition. Other methods may be used and are known to those of skill in the art.

After coating, the composition may be cured. The coating may be dried, for example, by heat. In some embodiments, the coating is cured at a temperature in a range of 25° C. to 250° C. In some embodiments, the coating is cured for a time in a range of 0 to 48 hours.

The surfactant plays a role in pore formation, as described in detail in the examples, and so the surfactant concentration may affect the resulting properties of the coating. In some embodiments, the surfactant is added to the alkoxysilane and perfluoroalkoxysilane at a concentration xs expressed as a mass percent of surfactant to total silanes=100% (surfactant/ (alkoxysilane+fluoralkylsilane+surfacant)=0 to 15%, in some embodiments, in a range of 0 to 10%.

In some embodiments of the invention, the ratio of total silane concentration to the total acid concentration (M) is in a range of 10:1 to 10,000:1, and in some cases, in a range of 100:1 to 1000:1.

Methods of Prevention Adhesion

Also provided herein are methods of preventing adhesion to a substrate, comprising coating the substrate with a coating according to an embodiment of the invention. Any suitable substrate may be coated. Examples of substrates include wood, stone, metals (including germanium, cobalt, chromium, nickel, aluminum, zirconium, tin, hafnium, vandaium, and titanium), metal alloys (including titanium-niobium, titanium-aluminum-vanadium, titanium-aluminum-niobium, vanadium steel, cobalt chrome, the superalloy CoCrMo, and stainless steel), carbon, carbon fibers, carbon polymer, ceramics and glasses (including oxides, carbides, nitrides, or nitro-carbides of silicon, titanium, tantalum, tungsten, zirconium, niobium, chromium, or aluminum), ceramic-metal composites; synthetic and natural polymers and copolymers (including rubber, nylon, silicone, polyurethane, polyethylene, polyvinyl chloride, polystyrene, polyetheretherketone, polytetrafluoroethylene tetraphthalate, polyethylene tetraphthalate, polytetrafluoroethylene, polyglycolic acid, latex, polyglycolic acid, polylactide-coglycolide, polylactic acid polymethyl methacrylate; latex, gelatin, collagen, albumin, and globulin) and any combination thereof. Any other suitable organic or inorganic material may also be used as a substrate. Applications for use with such coatings include, but are not limited to, restoration and improvement of architectural structures and urban infrastructure, industrial/anti-fouling, optoelectronics (photovoltaics, fibers, displays), automotive, textile, and household.

EXAMPLES

Example 1: Preparation of Coatings

Fluorinated silica films were synthesized at room temperature via co-condensation of fluorinated silane with an alkoxide silica precursor in the presence of a surfactant. Tetraethoxysilane (TEOS, Acros Organics) was used as the alkoxide. A perfluoropolyether silane (FPES, Fluorolink S10, Solvay Solexis) was used for functionalization in order to present the best possible surface for non-wetting properties. Fluorolink S10, which has the structure shown below, was selected for this study because it has a fairly large molecular weight (average=1850 g/mol) compared to perfluoroalkylsilanes and two silane grafting end groups. Longer functional molecules have been shown to increase the hydropobic/oleophobic character of films, and two grafted ends increases resistance to mechanical removal from the matrix. Additionally, interchain hydrogen bonding between amide moieties has been found to enhance intermolecular stability. Pluronic F127 (MW=12600, PEO106PPO70PEO106, a gift from BASF) was used as the surfactant.

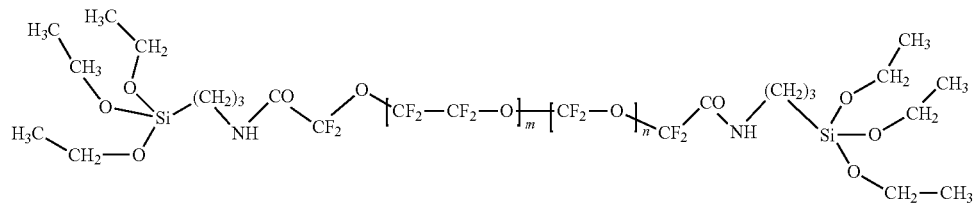

Chemical structure of Fluorolink S10, m/n=1.5-2.5, 2<n<5, and 5<m<9.

Coating solutions were synthesized in 35 g batches as follows. First, TEOS was hydrolyzed with water and a small amount of HCl in the molar ratio 1-xfTEOS:4H2O:0.001HCl. After 60 minutes of stirring, FPES was added and the sol stirred for 5 minutes to allow FPES hydrolysis. The sol was then diluted with ethanol to achieve a final molar ratio of 1-xfTEOS:xfFPES:4H2O:0.01HCl:20EtOH. The sol was stirred for an additional 24 hours and filtered through a 0.47 filter. The surfactant template was then added at a concentration xs expressed as a mass percent of F127 to total silanes=100% (F127/(TEOS+FPES+F127). The range of xf was 0.2-0.5, and the range of xs was 0-10%. After several minutes of mixing to ensure homogeneity, the sols were coated on soda-lime glass microscope slides by dip coating at a withdrawal speed of 200 mm/min in ambient air (23±2° C., 45±5% relative humidity). Slides were first cleaned by sonication at 40° C. for 15 minutes each in an acid-based detergent, multiple washes of deionized water, and finally acetone. Coated films were then dried for 24 hours at ambient conditions before curing at 200° C. for 3 hours in a box furnace with a ramp rate of 10° C./min.

Example 2: Characterization Techniques

Films were abraded using a lab-built reciprocating polishing wear apparatus. The details of the instrument are available elsewhere (See, Kessman, A.; Huckaby, D.; Snyder, C.; Kukureka, S.; Cairns, D. Wear 2009, 267, 614-618). Briefly, this instrument uses a vertically-loaded, conformal polishing surface to uniformly and gradually wear through the surface of a film of thickness on the order of several hundred nanometers. The polishing media, composed of an aqueous slurry of 0.3 µm alumina particles (90-187120, Allied), is trapped in a cloth pad (90-150-285, Allied). The pad is in contact with the surface over a nominal area of 175 $mm^2$, and a 4.70 N normal force is applied while the pad reciprocates over a stroke length of 35 mm at 0.1 Hz. These conditions were chosen to represent conditions similar to that of a finger touching an electronic sensor or manual cleaning of devices like solar panels. Samples were periodically removed for analysis, before which they were cleaned with water followed by alcohol to remove residue from abrasion.

Static contact angles were measured by placing five drops (~1.0 µL each) approximately 1 mm apart to cover a macroscopic and representative area, compared to the microscopic size of film structural features, and the results were averaged. Deionized water and n-hexadecane (Alfa Aesar) were used as test fluids. Film thickness and roughness were measured on a Veeco Dektak 150 stylus profilometer. Roughness was measured over a 1000 µm scan length. Film wear rates were calculated from a weighted linear least squares regression fit of film thickness versus total sliding distance of the reciprocating wear device and expressed as film thickness lost per meter sliding distance, nm/m.

X-ray photoelectron spectroscopy (XPS) was conducted on a Physical Electronics PHI 5000 VersaProbe system. The X-ray beam was 100 µm, 25 W, and 15 kV, from a monochromatic Al Kα source using charge neutralization and pass energy=93 eV. Depth profiling was conducted by Ar sputtering a 2 mm square area at 4 kV and 10 µA. Spectra were collected from F1s, C1s, and Si2p levels. X-ray diffraction (XRD) was conducted on a Bruker D8 Discover diffractometer with Cu-Kα radiation (λ=0.15417 nm, 40 mA, 40 kV), a 2Θ step with of 0.01°, and step of 1 s.

Porosity and pore size distribution were determined by N2 adsorption at 77 K using a Micromeritics ASAP 2020 analyzer. Samples for porosimetry were taken from freestanding films cast by evaporation of coating solutions and then calcined at 400° for 24 hours. This treatment was done to remove residual organics while minimizing film densification through collapse of pores. These samples were then degassed under vacuum at 120° C. for 1 hour prior to the adsorption. The Barrett-Joyner-Halenda (BJH) method was applied to the adsorption isotherm for the analysis of pore-size distribution. The porosity of the films was determined from the ratio of pore volume to sample volume, assuming a silica density of 2.2 g/cm3 (See, Williford, R.; Li, X.; Addleman, R.; Fryxell, G.; Baskaran, S.; Birnbaum, J.; Coyle, C.; Zemanian, T.; Wang, C.; Courtney, A. Micropor. Mesopor. Mat. 2005, 85, 260-266. See also, Grosso, D.; Balkenende, A.; Albouy, P.; Ayral, A.; Amenitsch, H.; Babonneau, F. Chem. Mater. 2001, 13, 1848-1856).

Hardness was measured by nanoindentation (NHT CSM Instruments) of a 10 μm radius spherical diamond indenter. The maximum penetration depth was set to 10% of the coating thickness to minimize substrate effects.

Atomic force microscopy was conducted on a Molecular Imaging PicoScan 3000 system in contact mode with Si tips on cantilevers of nominal k=2.5 N/m and radius <10 nm. Deflection and force were calibrated by using the slope of the force curve on the approach and the nominal cantilever spring constant. The adhesive force between the tip and film surface was taken as the cantilever pull-off force adjusted by the cantilever resting position using a 5 nN applied load (See, Tsukruk, V.; Bliznyuk, V. Langmuir 1998, 14, 446-455). Three approach-retract curves per location were averaged with sweep time set to 1 s each, and five of these measurements were taken over random sample spots on the specimens. Relative friction measurements were made by applying forces in the range of 0-50 nN to the tip scanning over 500 nm at a speed of 10 μm/s. All measurements were conducted at 21±2° C. and 45±5%. The tip was cleaned between samples by immersion in acetone for 1 min followed by air-drying.

Example 3: Chemical Properties of Coatings

All unworn films (synthesized in Ex. 1) had contact angles in the range of 105-110° for water and 63-67° for n-hexadecane, with standard deviations of <2°. The contact angles on unworn surface were independent of FPES concentration, which is often the case provided that the concentration of the hydrophobic moiety exceeds a minimum threshold. After a small number of wear cycles (sliding distance<20 m), the contact angles (CA) decreased, eventually fluctuating around some average value, reported here as the bulk contact angle. Although we describe the surface characteristics in more detail in the later section on tribological properties, we should mention here that the coatings were all relatively smooth (Ra<50 nm) both before and after polishing wear, and so the contact angle measurements can be considered unaffected by surface roughness effects.

Figure 2A:
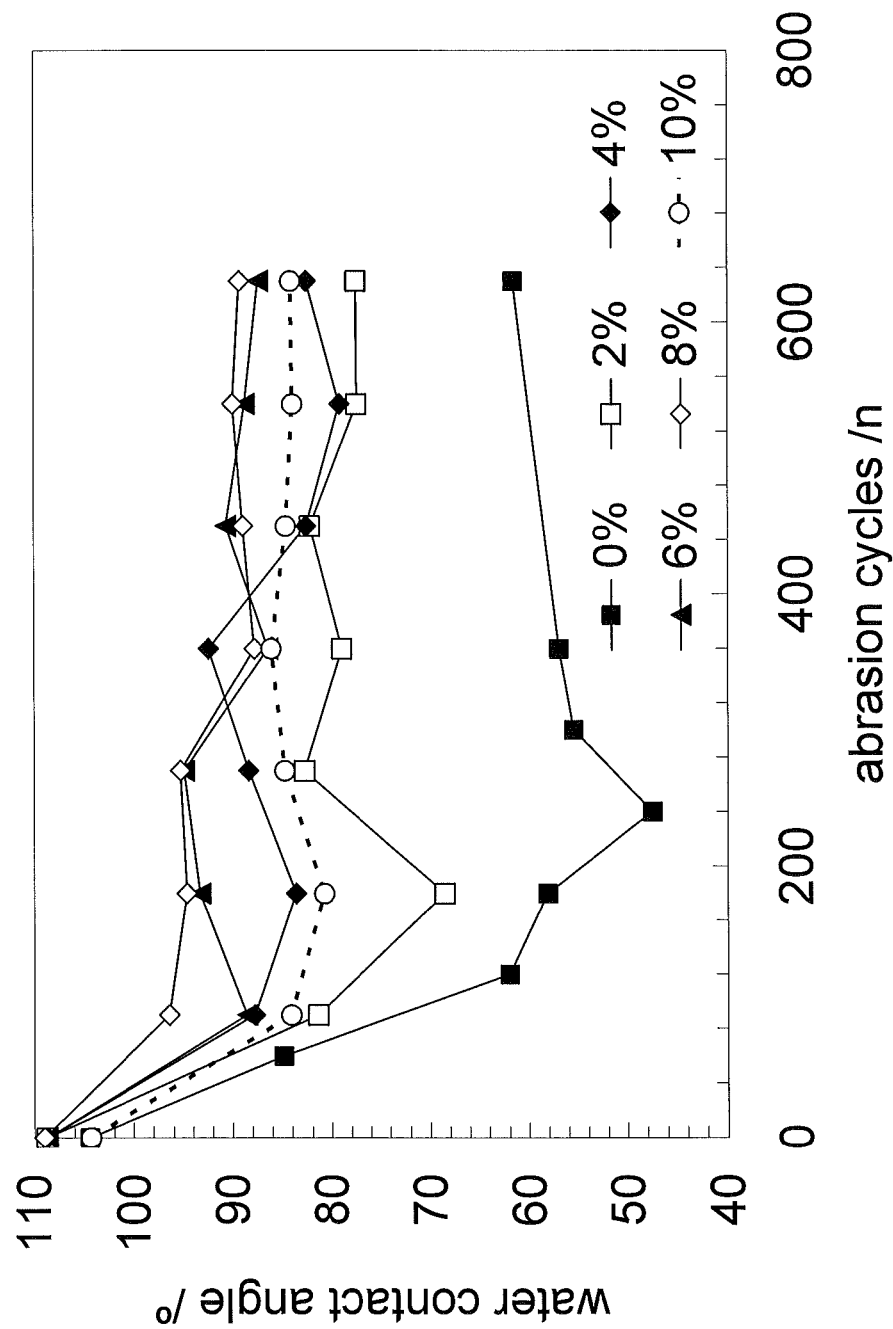
FIG. 2A provides contact angle of water as a function of reciprocating wear cycles for films synthesized with different surfactant concentrations (shown in legend) and xf=0.04.
Figure 2B:
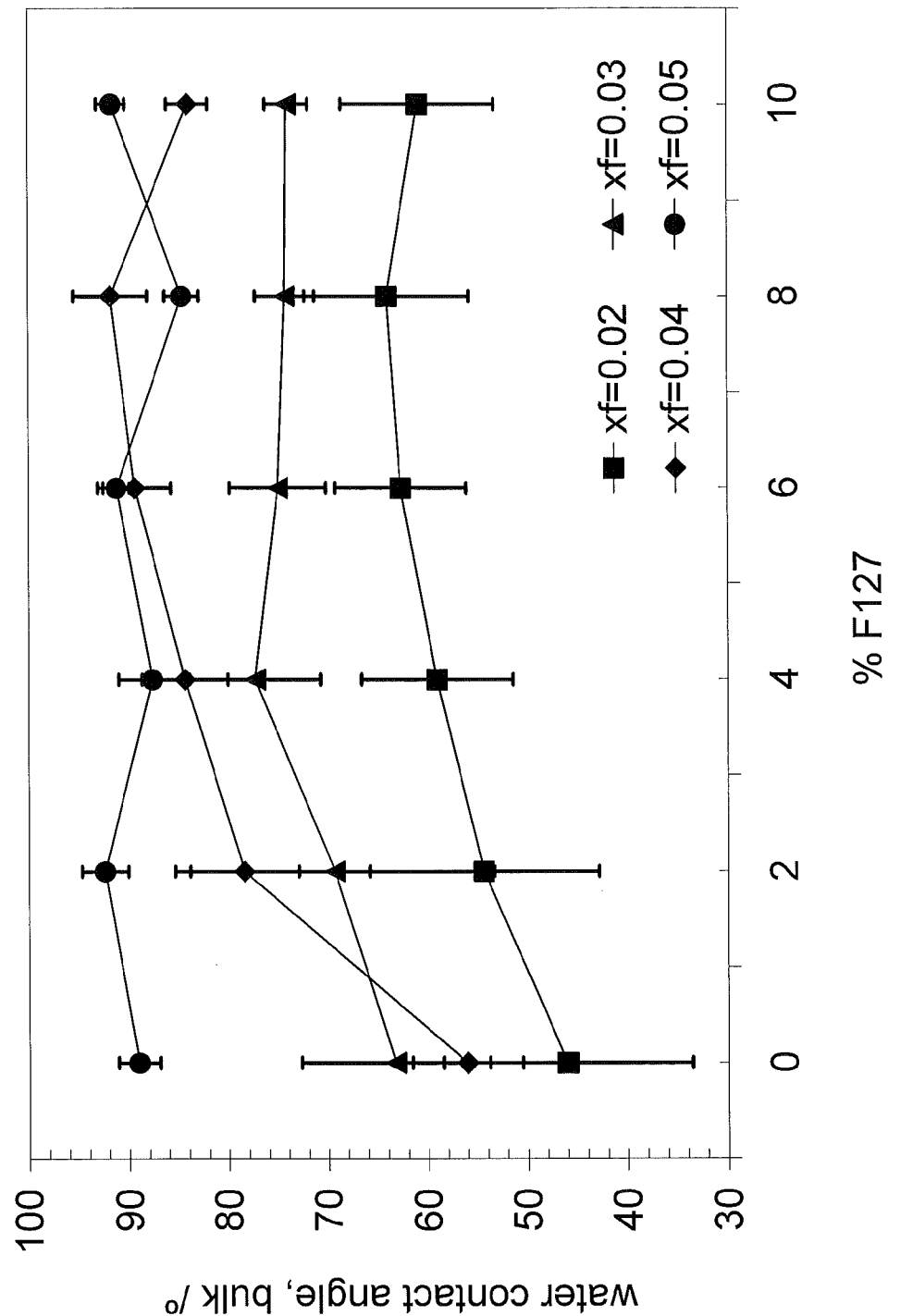
FIG. 2B shows average contact angle of water measured on worn surfaces for compositions with various FPES and surfactant concentrations.
Figure 2C:
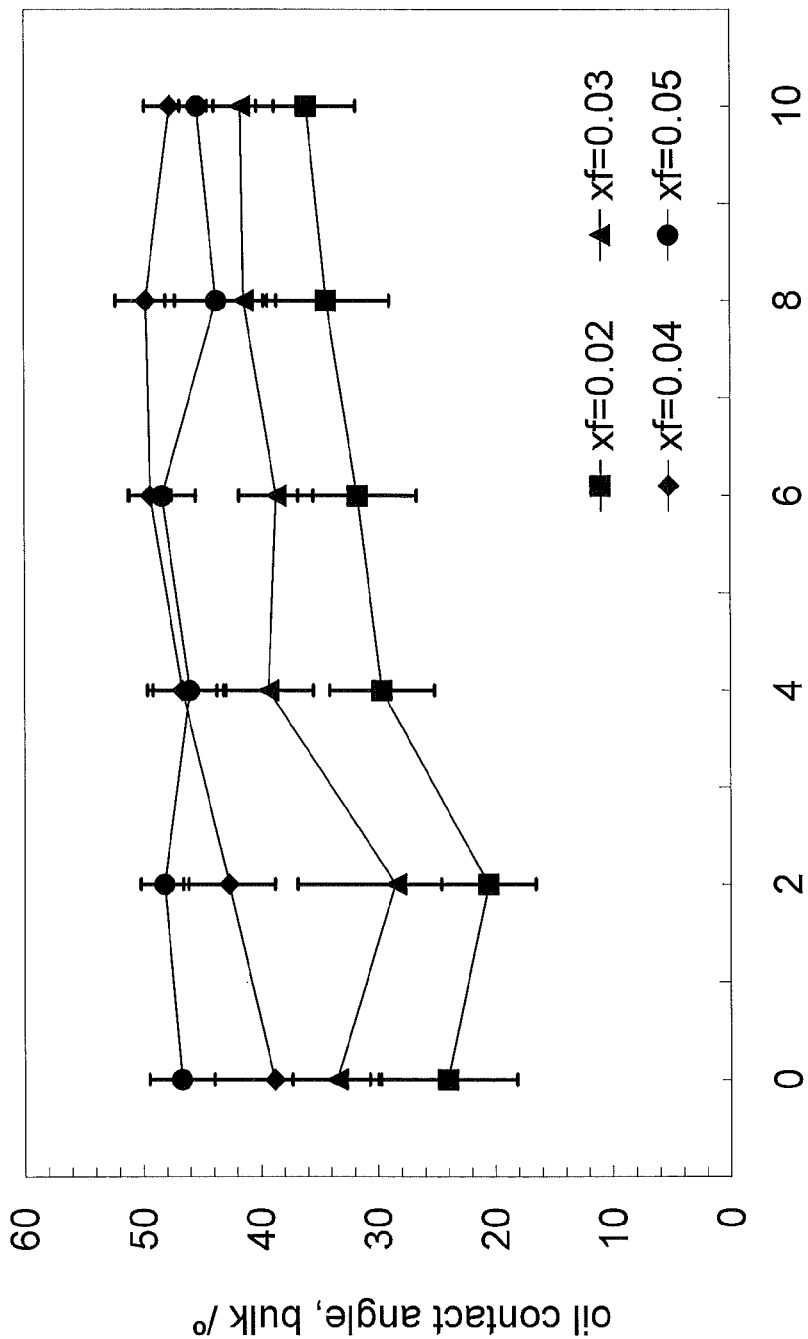
FIG. 2C shows average contact angle of n-hexadecane measured on worn surfaces for compositions with various FPES and surfactant concentrations.

FIG. 2A shows a sample plot of CA versus sliding distance for films synthesized with xf=0.04 and varying surfactant concentration. As surfactant concentration is increased, we observe a gradual increase in the CA of water as measured on the film bulk, as opposed to the unworn top surface. Bulk contact angle versus composition data are summarized in FIG. 2B for water and FIG. 2C for oil. These figures show the average value of CA measured on worn surfaces for all compositions synthesized. Although all surfaces are strongly hydrophobic when unworn, the CA measured after wear depends substantially on the overall concentrations of FPES and surfactant added during film synthesis. For example, although addition of surfactant can increase the CA of water from 47° to 64° when xf=0.02, the CA cannot be increased beyond this point due to conservation of mass—there must be sufficient fluorinated moieties to provide a non-wetting surface. Clearly, at xf=0.02 the available surface area for functionalization is not saturated, since increasing xf positively influences the maximum attainable CA. Ultimately, the bulk CA of water may be increased substantially from <50° to >90°, depending on how FPES and surfactant concentrations are balanced. However, for films with a high concentration of FPES, xf=0.05, contact angles stay close to 90 independent of surfactant concentration, indicating that a different mechanism is dominating the formation of these films. As discussed later in the section on tribological properties, these films were worn in a discontinuous manner, with areas of the coating delaminating from the substrate. The film discontinuity limits the measurable CA of ~1 μl drops even though the concentration of FPES is very high.

At higher surfactant concentrations, the water CAs decrease slightly. This phenomenon may be due to the accumulation of surfactant and its decomposition products in the film bulk. These hydrophilic species may not be completely removed by the relatively mild thermal treatment used here, which has been minimal in order to protect the FPES from decomposition. Thermal decomposition of block copolymers such as Pluronic F127 in mesoporous silica has been shown to begin at temperatures as low as 160° C., but decomposition byproducts remain until much higher temperatures owing to stabilization by interaction with the inorganic matrix and diffusion effects. In this case, we believe that these products are not completely removed and mitigate the hydrophobic effect of the fluorine-containing moieties, which will be discussed further together with the XPS data.

Figure 3A:
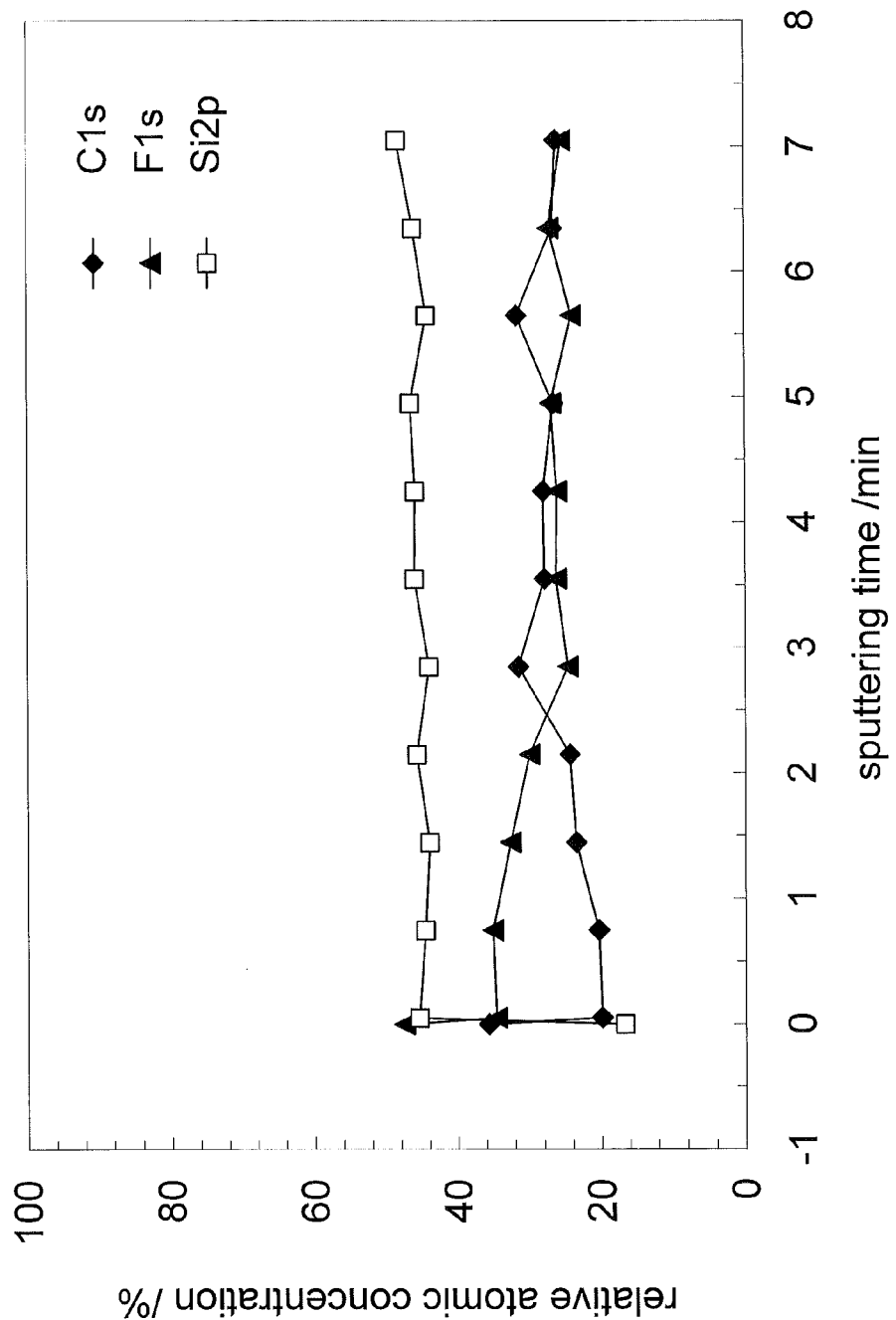
FIG. 3A shows XPS depth profile of film with composition xf=0.04, xs=8%. Inset shows sample C1s spectra from film surface (blue) and from bulk (red). Atomic concentration ratios, F/Si (FIG. 3B) and C/Si (FIG. 3C) determined by XPS depth profiling for various compositions synthesized are also shown.
Figure 3B:
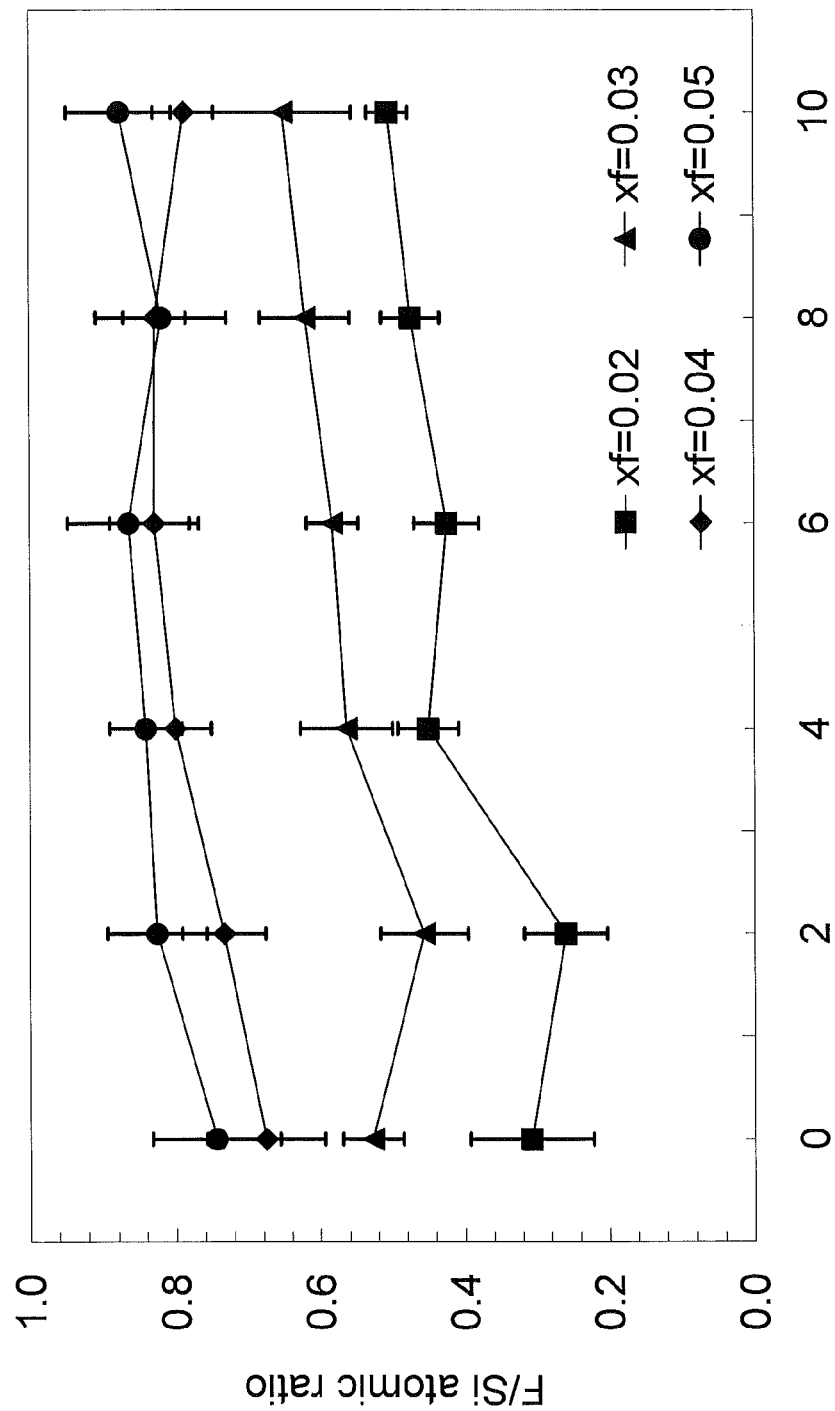
Figure 3C:
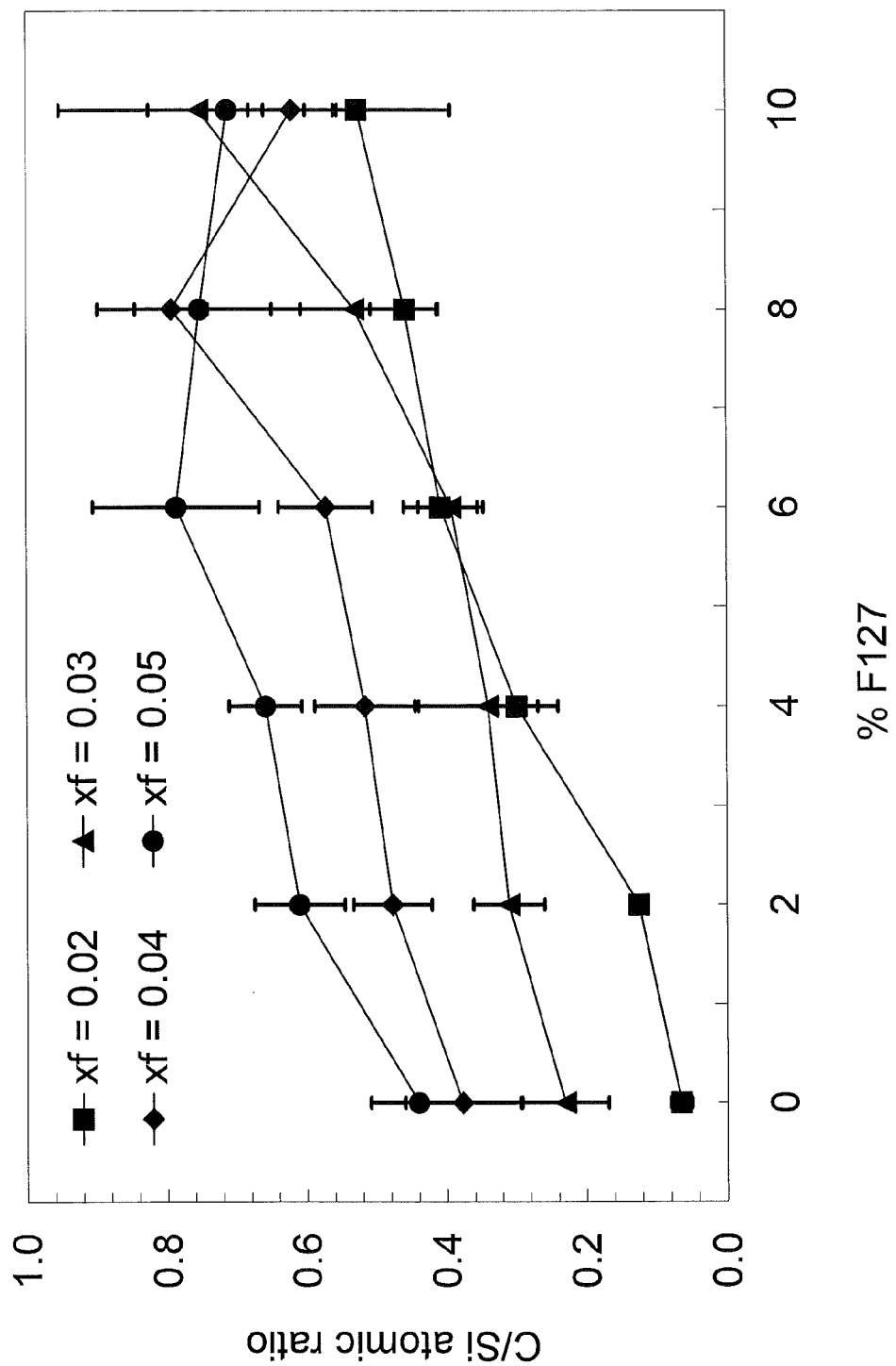

XPS analysis proceeded in a similar way to that of bulk CA. Films were analyzed by depth profiling, showing somewhat different characteristics at the top surface and eventually stabilizing around an average composition. FIG. 3A shows a sample depth profile (xf=0.04/xs=8%) showing film composition before the crossover point at the film-substrate interface. Data were averaged from after film sputtering began to before the crossover point, and these averages were used to compute atomic concentration ratios representing the bulk film composition, which are represented in FIG. 3B and FIG. 3C. As illustrated by FIG. 3A, and is typical of all the films measured, the composition is not perfectly homogeneous throughout the thickness. This variability is expressed in the error bars of FIG. 3A and FIG. 3B, which represent 1σ of the atomic ratios, and is also observed macroscopically as contributing to the variability of the CA measurements.

The trends shown in FIG. 3B and FIG. 3C indicate a moderate increase in the F/Si ratio with increasing surfactant concentration. Compared to this, the C/Si ratio increases at a significantly higher rate. Although the integration of the C1s core level spectra to compute concentration includes some contribution from the C—F bonding present in the FPES, the increased slope of the C/Si trend compared to F/Si indicates an accumulation of other carbon-containing species. We also observed this directly from the C1s spectra (example shown in inset to FIG. 3A) that show an increase versus surfactant concentration in peaks centered in the range of 284-288 eV, which represent various C—C and C—O type bonding, and a much smaller increase in intensity of peaks in the range of 292-295 eV, which represent C—F bonds. Taken together, these results confirm the incomplete decomposition and removal by thermal treatment of the F127 surfactant, and an accumulation of the surfactant molecule and/or its decomposition byproducts trapped within the pores and silica matrix.

Example 4: Structural and Mechanical Properties

Coating thickness was measured by stylus profilometry and ranged from 300-700 nm. Thickness increased linearly with both concentration of FPES and surfactant, since these organic species add bulk to the alkoxide matrix.

XRD measurements showed no discernable diffraction peak in the range of 0-5 2Θ, indicating a completely disordered mesoporous structure of the silica framework. Pore ordering depends on sol aging time and extent of hydrolysis of precursors before deposition and also on the concentration of surfactants used.

Films cured at 200° C. for 3 hours showed no significant internal surface area when analyzed by nitrogen adsorption porosimetry. An extended high-temperature treatment at 400° C. for 24 hours was necessary in order to sufficiently decompose surfactant and FPES molecules within the matrix and obtain a true porous structure. Consequently, the functional films are mesostructured while technically not being mesoporous. Nonetheless, porosimetry provides a measure of the structure of the silica framework surrounding the functional pores. While the pores are filled in the functional material, the organic FPES and surfactants are soft and contribute little to the overall mechanical properties of the film. Furthermore, the high-temperature treatment should densify the material through the condensation of the silica matrix, contracting it around the pores and shrinking them. Therefore, the porosity and pore diameters reported here should be understood as somewhat relative measurements that are proportional but not identical to the true properties of the films that were not exposed to the high thermal treatment. The BJH method, furthermore, is based on an assumption of cylindrical pore geometry, which the TEM micrographs that follow indicate is not the case in this study. Pore size distributions obtained by the BJH model applied to non-ideal pore geometry tend to underestimate pore size. Nonetheless, as TEM micrographs below indicate, the porosimetry calculations are quite close to what we observe in the micrographs.

Figure 4A:
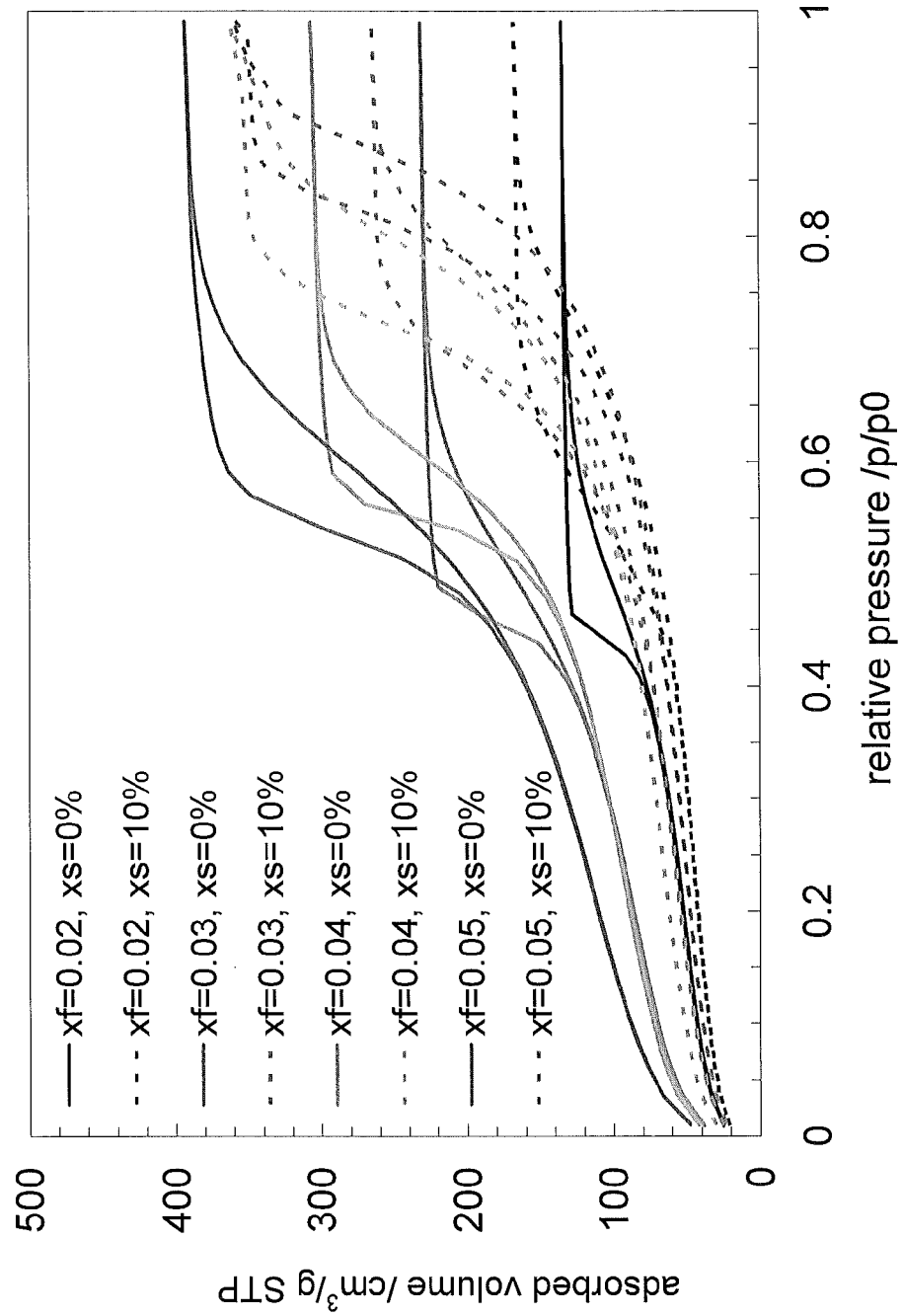
FIG. 4A provides nitrogen adsorption-desorption isotherms on calcined films synthesized with different fluorosilane and surfactant concentrations.

Some sample nitrogen adsorption-desorption isotherms are shown in FIG. 4A. For clarity, some isotherms have been omitted, and the figure shows isotherms from films synthesized with the entire range of FPES concentrations studied and at the two concentrations of surfactant, xs=0 and 10%. All samples analyzed showed IUPAC type IV isotherms, which are characteristic of mesoporous materials. The trend is that both FPES and surfactant concentration increase the total adsorbed volume and shift the mesopore size to longer dimensions. Without surfactant addition we observe that the calcined material is still mesoporous, owing to the strongly amphiphilic nature of fluorosilanes, which have been shown to act as mesoporous templates synergistically with extremely small quantities of surfactants. When surfactant was added to films with xf=0.05, the films became less porous with less total surface area available for adsorption.

Figure 4B:
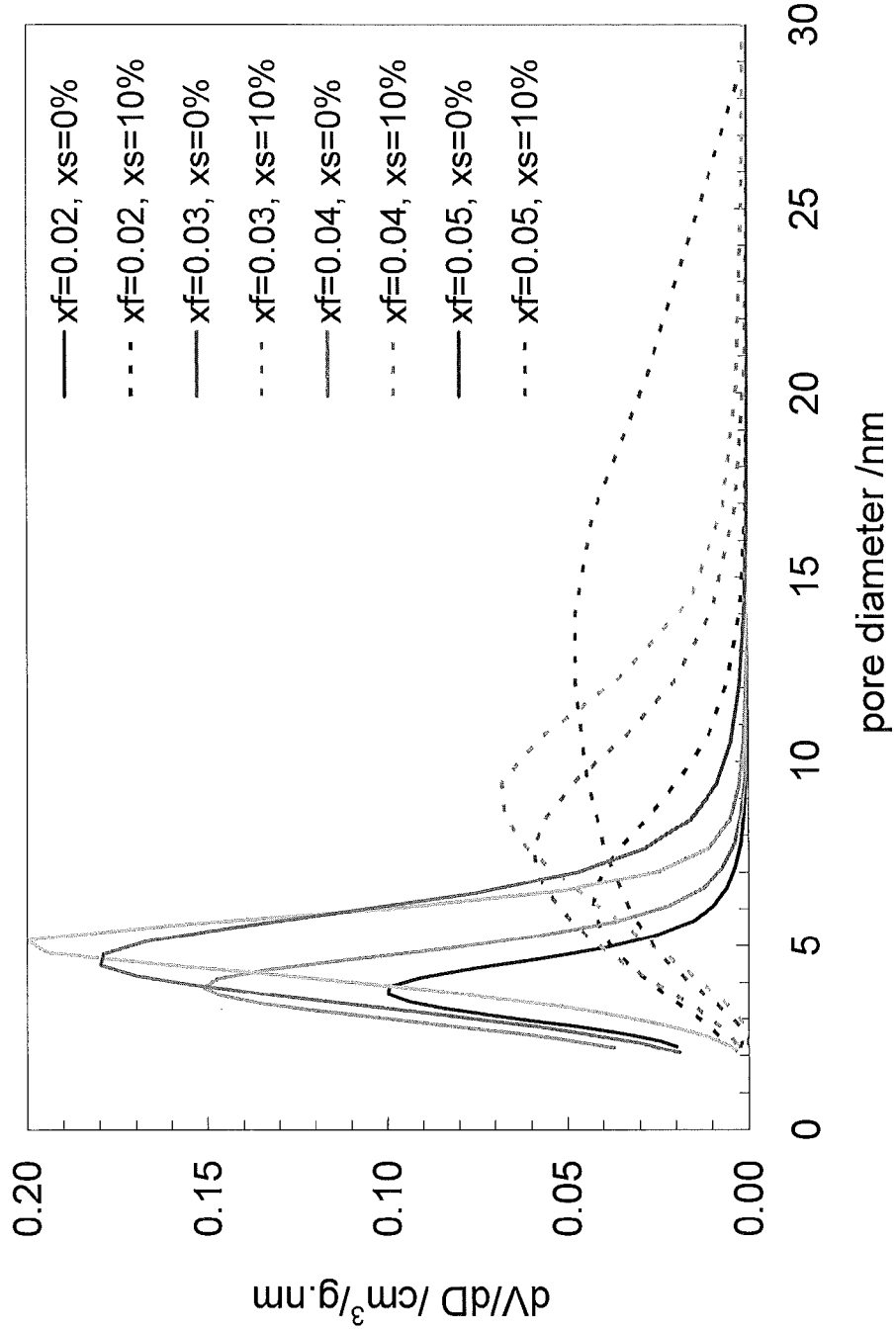
FIG. 4B provides BJH pore size distributions of calcined films synthesized with different fluorosilane and surfactant concentrations.

In all cases, addition of surfactant drops the adsorbed volume in the range of micropore filling, while increasing it at higher pressures which represent the capillary condensation in the mesopore size range. This transition is confirmed by the BJH pore size distributions of the same samples, shown in FIG. 4B, which were calculated from the adsorption isotherms. The pore sizes distributions shift to larger dimensions and spread out considerably once the surfactant is introduced. This seems to imply that without a pore template, the FPES molecules reside to a somewhat greater extent as evenly distributed throughout the film bulk as either individual molecules or as small molecular aggregates. Upon calcination the FPES is removed and leaves behind small pores with narrow size distribution, which is common when organosilanes are co-condensed with TEOS. In our case the size of those pores, around 4 nm in diameter, are somewhat larger than the IUPAC classification of micropores (<2 nm) which reflects the relatively large size of each individual FPES molecule (MW=1850) compared to smaller organosilanes. When the surfactant template is added, it allows the FPES to arrange at higher concentrations at the pore surfaces than in the bulk, and this is most likely due to the FPES acting as a cosurfactant together with the F127. We note also that for the film with composition xf=0.05/xs=10%, the pore size distribution has shifted considerably to larger sizes and has become very broad, which contributes to the lower porosity of these materials.

Figure 4C:
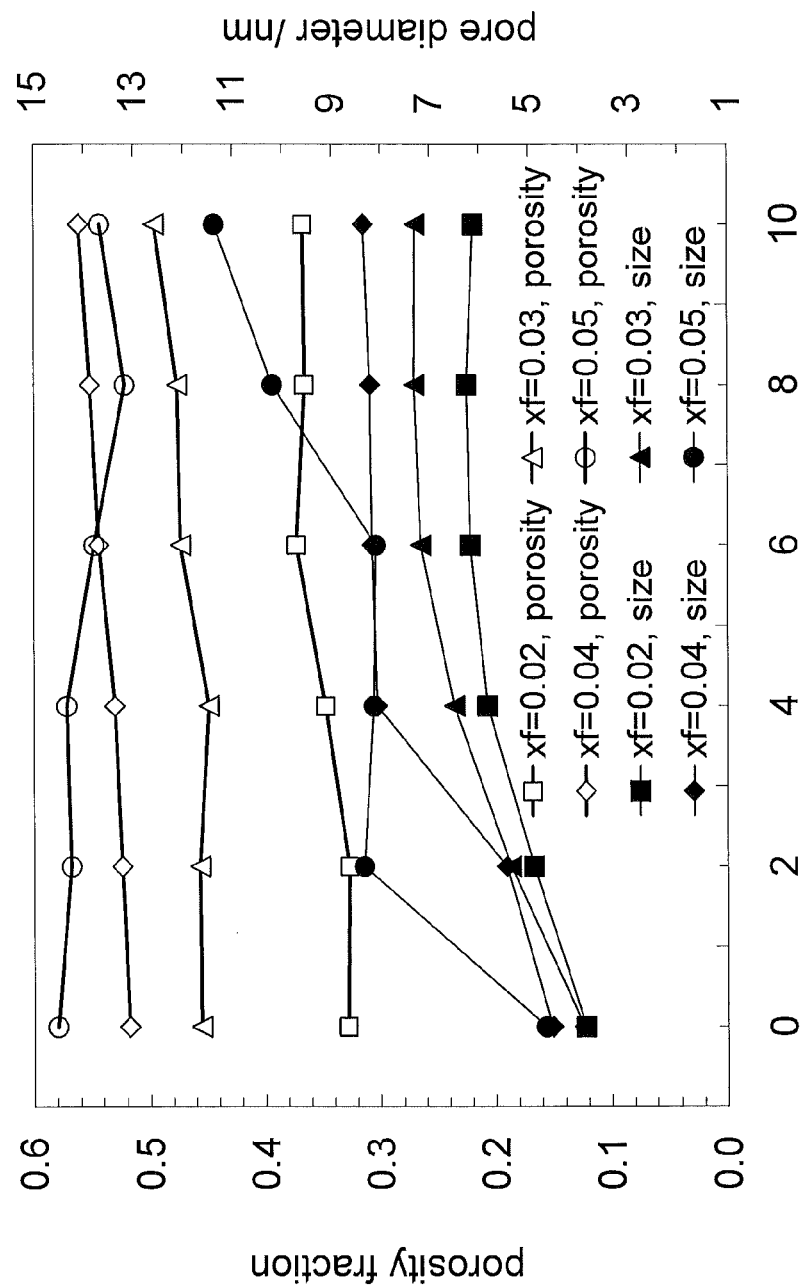
FIG. 4C provides a summary of porosity fraction and average pore diameter of calcined films synthesized with different fluorosilane and surfactant concentrations.

Porosity fraction and average pore size data based on BJH analysis are summarized in FIG. 4C. We observe that porosity generally increases linearly across the range of surfactant concentrations studied. Pore size, on the other hand, increases at low template concentrations but then is observed to level off and even decrease slightly at higher concentrations. This is due to the competing factors of pore volume and pore size: since pore volume must increase with addition of surfactant mass, we may expect pore size to become limited. As noted above, the exception is that films synthesized with the highest concentration of FPES. These films have large pores with very wide distributions, and porosity tends to decrease with surfactant concentration. At this extreme, the structure of the framework may begin to be compromised by the high concentration of FPES compared to TEOS. At this point, the FPES may physically interfere with gelation of the silica framework during film deposition, possibly resulting in a disordered and even partially lamellar structure. Such a structure would result in a lowering of porosity, an increasing in calculated pore size, and a substantial widening of the size distribution, all of which we observe from the data in FIG. 4C.

Figure 5A:
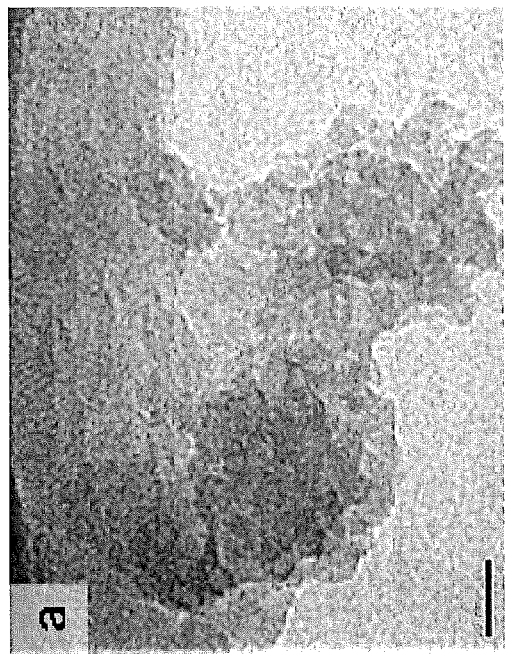
FIGS. 5A and 5B show TEM micrographs of films with a composition of xf=4/xs=10%.
Figure 5B:
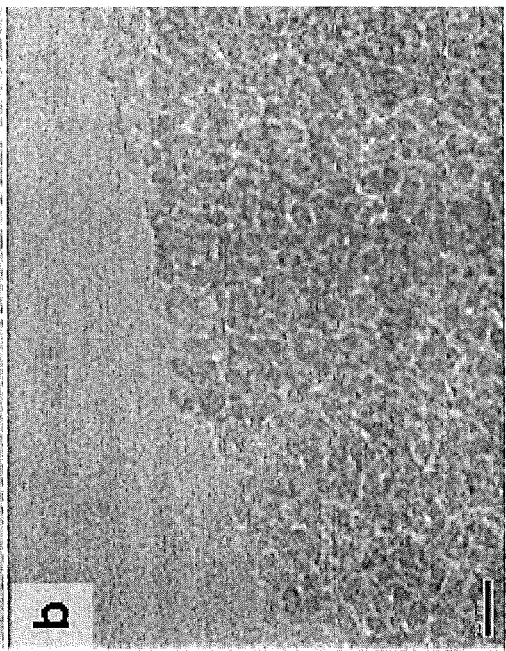

TEM microscopy was used to verify the structural characteristics of films, particularly regarding pore morphology, distribution and ordering, and any structural differences between films cured at 200° C. for 3 hours and 400° C. for 24 hours. Sample TEM micrographs are shown in FIG. 5, which are the same film cured at (a) low temperature and (b) high temperature. The film in (a) shows a low contrast between the pores and matrix, owing to the encapsulation of a large quantity of organics. The film in (b) shows higher contrast due to their calcination. In both micrographs we observe the non-circular and asymmetrical pore morphology and the lack of any long-range pore order. We also note that the sizes of the pores are quite variable, but are overall consistent between the two micrographs. This indicates that the BJH model still provides a useful measure of pore size for this material with an accuracy of within ~10% as determined by digital image analysis.

Figure 6:
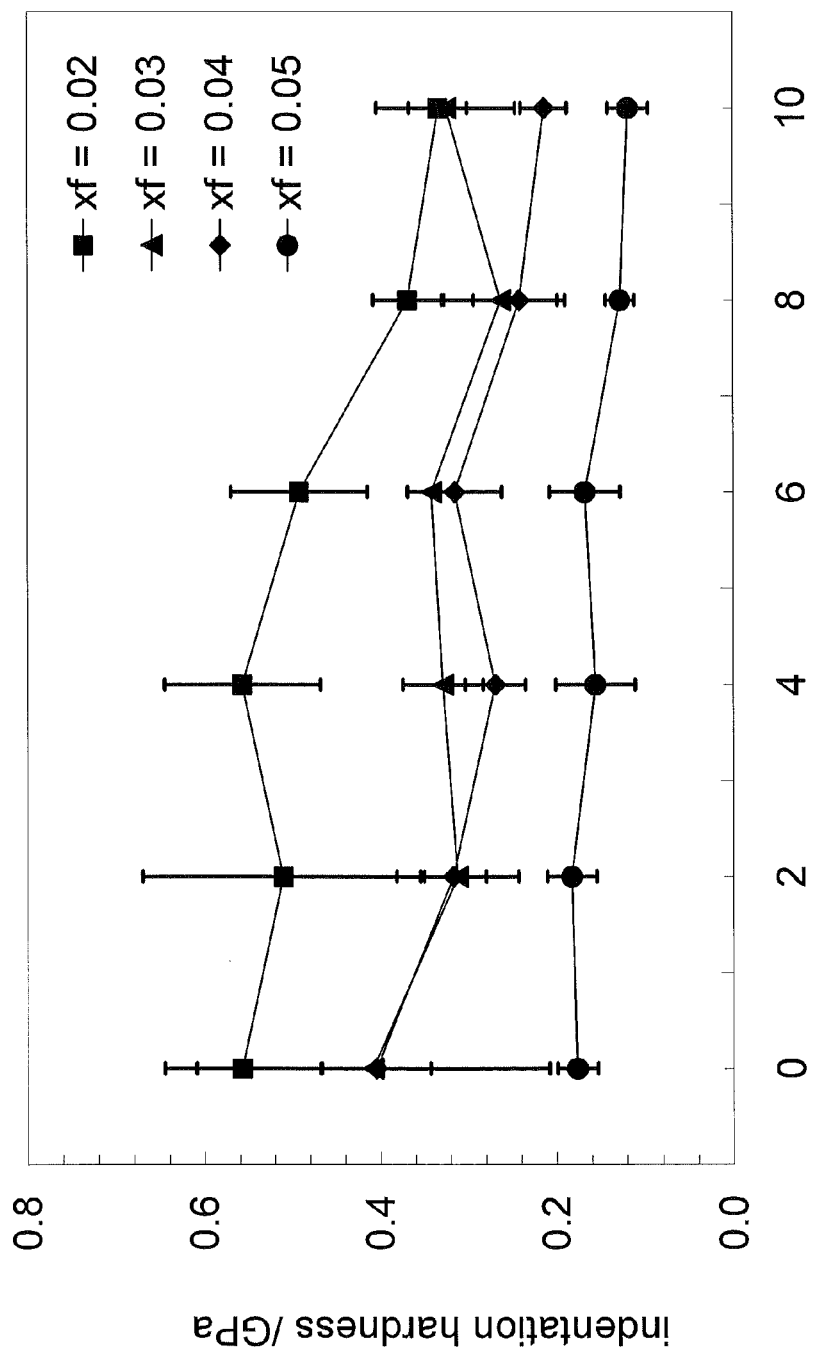
FIG. 6 shows the nanoindentation hardness of films with synthesized with different fluorosilane and surfactant concentrations.

Nanoindentation hardness values are summarized in FIG. 6. Hardness decreases roughly linearly with surfactant concentration, which is expected based on the increasing porosity of templated films. Hardness also decreases with addition of fluorosilanes, since these are soft and do not support loading as well as the silica framework. Overall, the hardness values are similar to those reported by Fan et al. for similarly porous films using large molecular weight swelling agents.

Example 5: Tribological Properties

Figure 7A:
FIGS. 7A and 7B provide optical micrographs of a film with composition xf=0.04/xs=10% worn for 100 m (FIG. 7A), and film with composition xf=0.05/xs=6% worn for 20 m (FIG. 7B). Sliding direction of wear for both micrographs is from bottom left to top right. Scale bars are 100 μm.
Figure 7B:
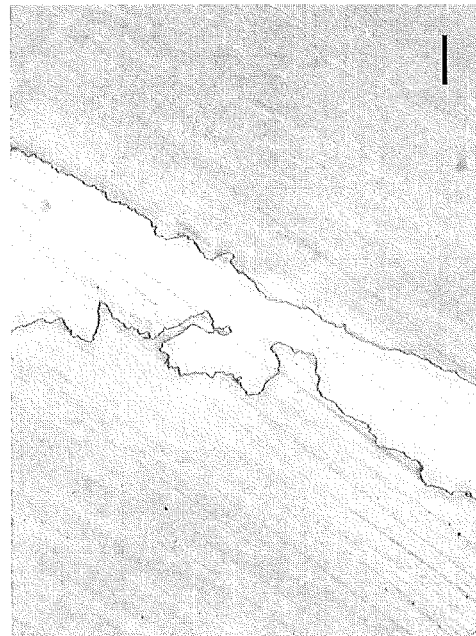

As deposited, all films were smooth with roughness Ra<2 nm as measured by stylus profilometry over 1000 μm scan lengths. During wear, after 10 m of sliding or 90 cycles, the roughness of the film surfaces increased to between 15 and 20 nm and remained in that range during all subsequent wear cycles. FIG. 7A shows an optical micrograph of a film with composition xf=0.04/xs=0.10 worn for 100 m. The film surface shows shallow wear tracks parallel to the sliding direction, and wear is caused by cohesive failure of the coated material. This behavior was noted for all films with composition xf=0.02-0.04. However, for films with xf=0.05, the wear behavior was different. FIG. 7B shows a film with composition xf=0.05/xs=6% worn for only 20 m. In this micrograph, which is representative of all films synthesized with xf=0.05, we observe shallow wear tracks on the coated portion that are parallel to the sliding direction. The roughness of these parts was <20 nm. However, large areas of the coating have been removed in a pattern indicative of adhesive failure and delamination of the coating from the glass substrate. This adhesive wear contributes to the high wear rates observed for the films with xf=5, as shown below.

Figure 8A:
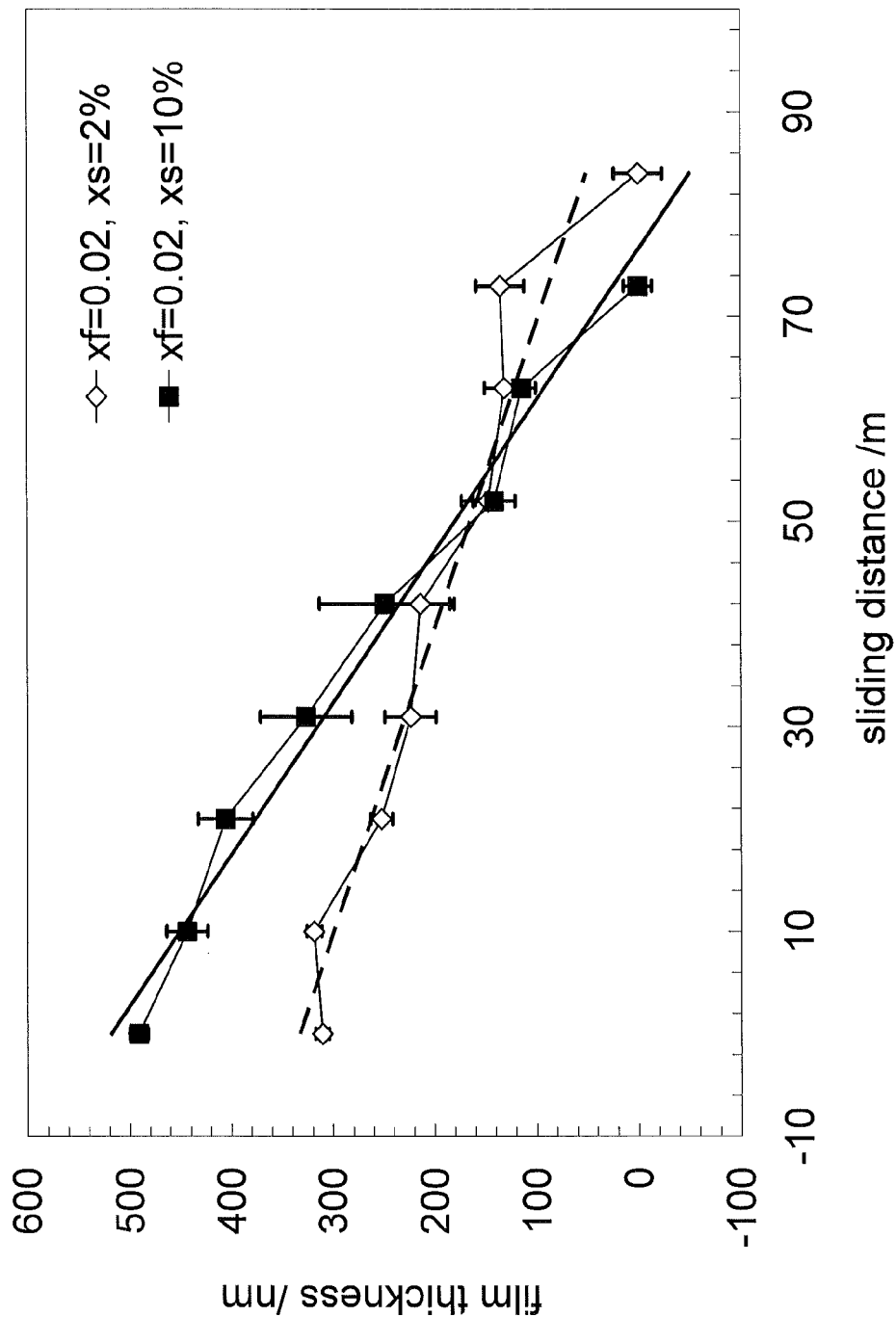
FIG. 8A provides sample plot of film thickness vs. reciprocating wear sliding distance. Wear rate was calculated from the slope of lines fit to these data.

Film thickness was measured periodically and these data are the basis for calculations of relative wear rate, which are expressed in thickness of film lost (nm) per sliding distance of wear (m), or nm/m. FIG. 8A shows a sample plot of film thickness measured every ~10 m of sliding distance. In this set, the film with xs=2% was 310 nm thick before wear. The film with xs=10% was 491 nm thick before wear, but is nonetheless entirely worn away before the thinner film. This is expected, based on the porosimetry and hardness data, which indicate that templating creates a more porous and therefore less mechanically robust structure.

Figure 8B:
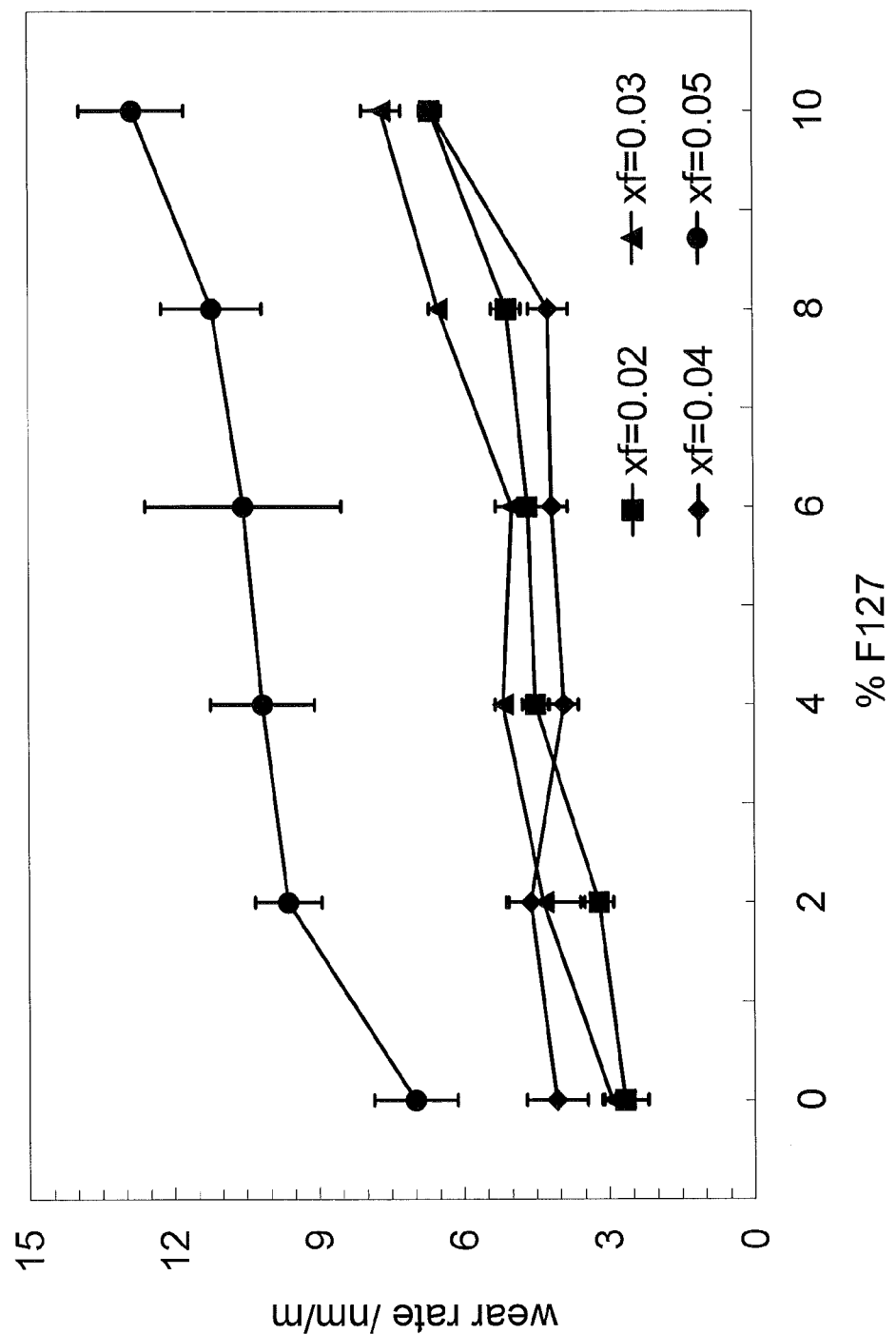
FIG. 8B provides wear rate vs. composition of films as determined by stylus profilometry film thickness measurements.

Although this general trend was observed across the entire range of compositions studied, the observed wear rate for certain films was not as high as we might expect based on structural properties (porosimetry and hardness) alone. FIG. 8B shows a summary of the calculated wear rates. For xf=0.02 and 0.03, the wear rate increases roughly linearly with surfactant concentration. However, for films with xf=0.04, the wear rate remains roughly constant for 0≤xs≤6% and only begins to increase at xs≥8%. Furthermore, when xs≥4% the wear rate is less than that of films with xf=0.02 and 0.03 even though those films are less porous and harder.

Figure 9A:
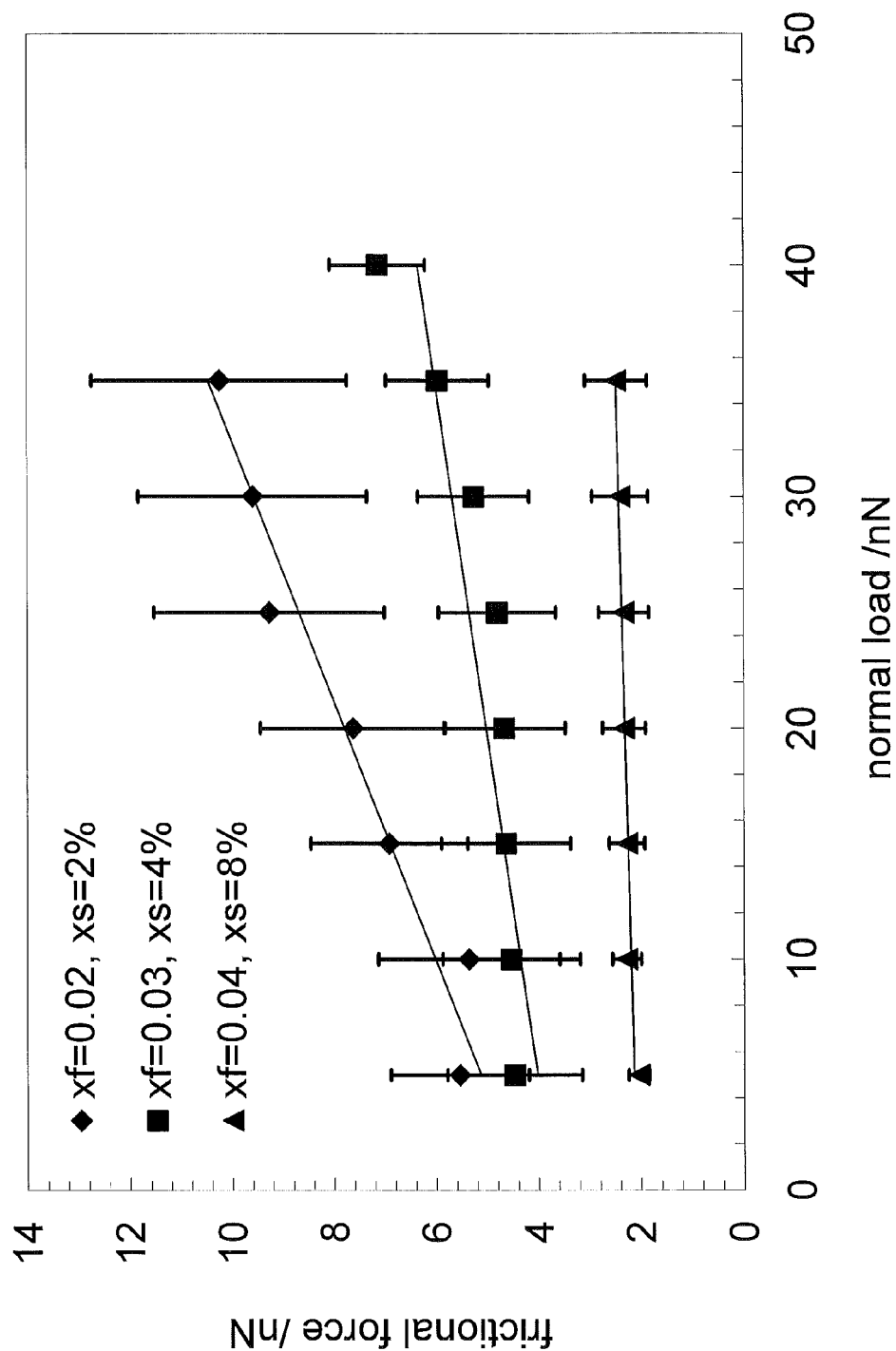
FIG. 9A provides sample friction force vs. load curves of partially worn films performed using AFM at a scan speed of 10 mm/s.
Figure 9B:
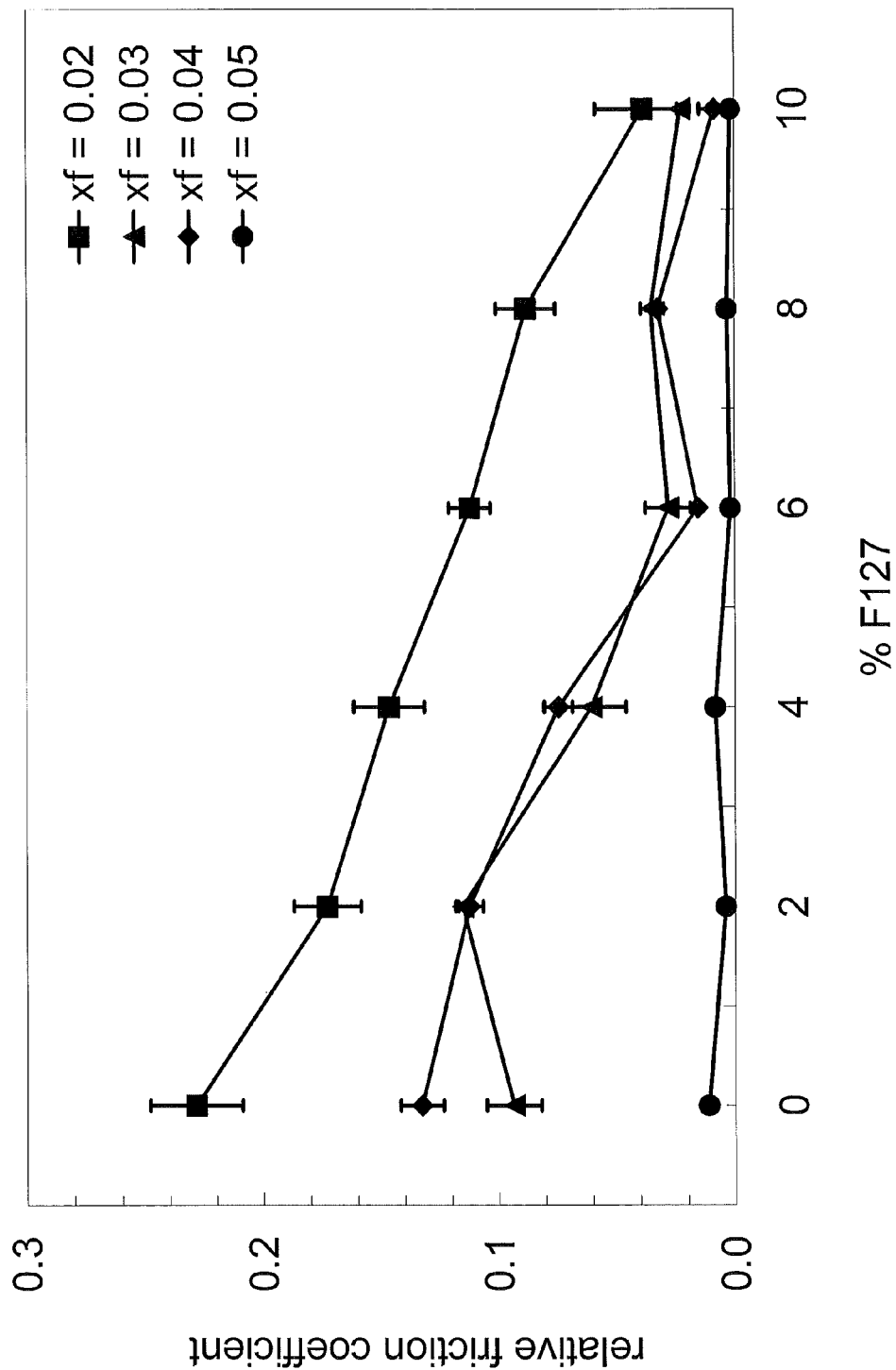
FIG. 9B provides relative friction coefficients of partially worn films performed using AFM at a scan speed of 10 mm/s.

To help explain this phenomenon, relative friction coefficients were determined. Friction was measured on films that had been partially worn for 20 m sliding distance (180 cycles) in order to expose the inner surface, which is what was presented to the abrading media for most of the coating lifetime and was always less hydrophobic and less lubricious than the unworn top surface. AFM was selected for tribological characterization in this study since the actual tribological contact using the reciprocating apparatus is between the film and 0.3 μm alumina particles, so the contact of an AFM probe tip is more appropriate than a microscale tribometer even though a macroscopically large area was worn on each film. FIG. 9A shows a sample plot of friction force versus normal load for films ranging from lesser to greater hydrophobicity. Relative friction coefficients were calculated from the slope of lines fit to these curves by a weighted least squares method. FIG. 9B shows a summary of relative friction coefficients for various compositions. We observe that films that are more hydrophobic are also lower friction due to the lubricating nature of fluorocarbon materials. Consequently, there should be a mitigating effect on wear rate of lower friction surfaces, provided that the film material has sufficient shear strength. For films with xf=0.05, the material still wears quickly even though it is lubricious, and this is partially due to the adhesive failure of the coating from the substrate, as well as its low hardness.

Figure 9C:
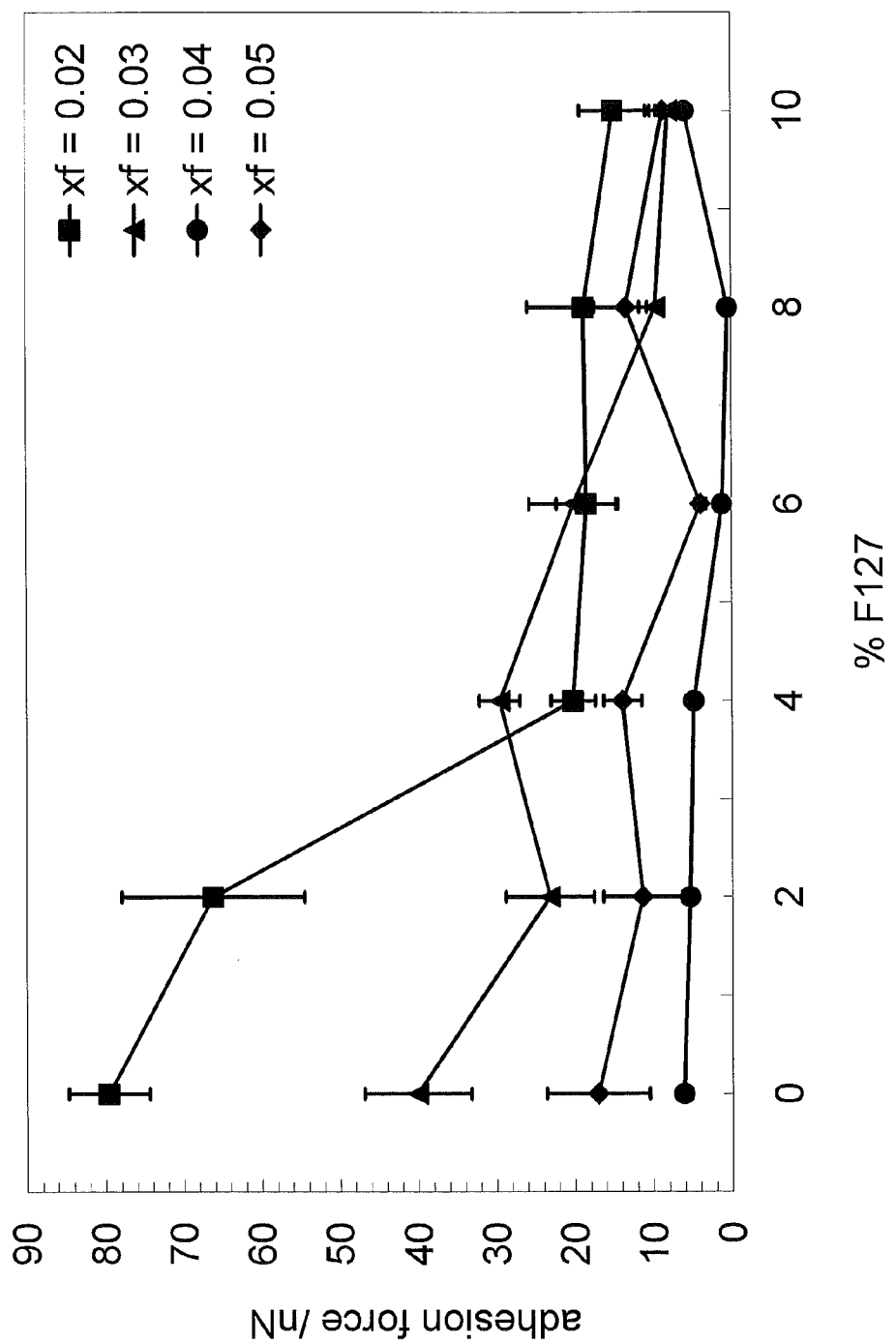
FIG. 9C provides adhesive forces between Si AFM tip and surface of partially worn films.

AFM tip pull-off force was also determined for the partially worn films in order to provide a measure of the adhesive forces between a tip reference surface and the film surfaces. FIG. 9C shows a summary of the adhesive force for various compositions. The adhesive force is generally lowered as films become increasingly hydrophobic. Comparing the friction coefficients from FIG. 9C and FIG. 9B and adhesive force data from FIG. 9C, we note that the pull-off forces for more hydrophilic films (low xf and xs) must necessarily be higher than the actual adhesive forces between the tip and film materials, as has been described by Ren et al. for hydrophilic SiO2. For example, the adhesive force for film with xf=0.02/xs=2% shows an adhesive force of approximately 65 nN. Meanwhile, the maximum normal load applied for friction measurements was only up to approximately 35 nN and its relative friction coefficient=0.17. This has been attributed to the higher capillary forces acting between the tip and surface of hydrophilic materials, which increase the apparent pull-off force and adhesive behavior when compared to more hydrophobic surfaces.

Figure 10:
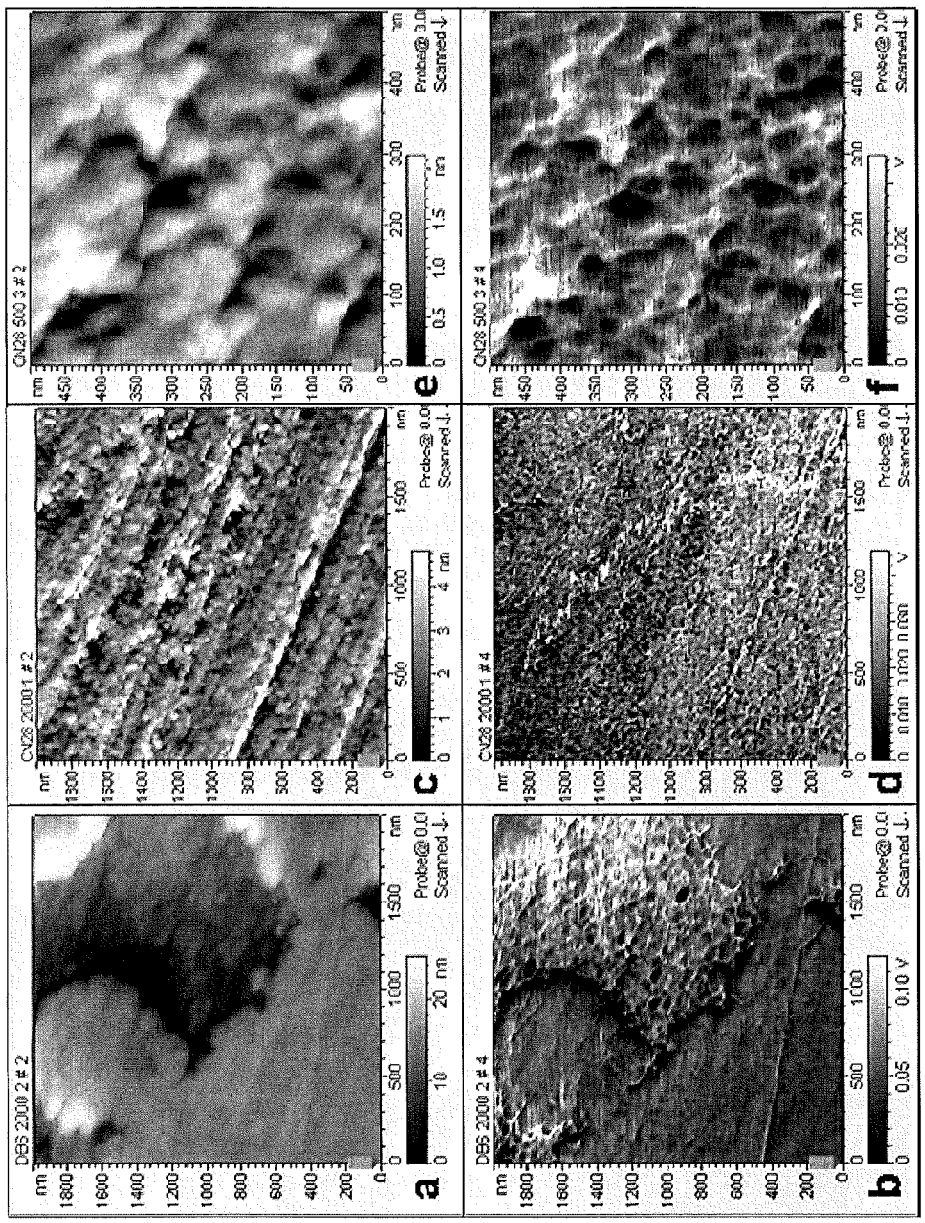
FIGS. 10A-10F provide topographic and friction force micrographs of captured by AFM of partially worn films. Sliding direction of wear for all micrographs is from top left to bottom right, and all films were worn for 20 m sliding distance.

Topographical and friction force micrographs were also obtained using AFM, and a sample of these are shown in FIG. 10. The sliding direction of wear for all micrographs was from top left to bottom right, and all films were worn for 20 m to expose the interior pore surfaces. The film with composition xf=0.02/xs=6% in (a) exhibits some shallow wear tracks parallel to the sliding direction. We observe also that the wear is delamination-like: the surface on the bottom and left of the micrograph is ~10 nm higher than the surface on the top right, which has been removed in a step-like manner. This change in thickness is close to the average film thickness measurements obtained by stylus profilometry. The friction force micrograph obtained of the same surface, shown in (b) illustrates the highly porous mesostructure of the film bulk, as represented in the top right portion of the image.

FIGS. 10C-10E show micrographs of the film with composition xf=0.04/xs=10%. The 2 μm topographical scan in (c) shows much more pronounced wear tracks compared to the film in (a), owing to its lower hardness. FIGS. 10E and 10F are 500 nm scans taken within the larger area of (c) and (d). The larger pores in the structure are clearly observable and confirm a disordered pore distribution. The friction force micrograph in FIG. 10F indicates lower friction with darker tones and higher friction with lighter tones. The micrograph FIG. 10F should be interpreted with consideration that topographical features such as steps and scratches have been shown to influence adhesion and friction mapping using AFM due to the increasing area of interaction between the surface and tip. In our case, we observe that in FIG. 10D only the deepest of the wear tracks detected in FIG. 10C are observable as artifacts in the friction force micrograph in FIG. 10D. Consequently, there may be some contribution of pore topography to the friction-force distribution in FIG. 10F, so these images should be interpreted in terms of the interaction between tip and surface materials. With that in mind, FIG. 10F may be showing that the internal pore surfaces are low-friction areas compared with the matrix material that makes up the pore walls. This would happen if, through cosurfactancy, the FPES moieties were more concentrated on the interior pore surfaces than if they were more evenly distributed within the bulk of the matrix silica. This complements the findings of the porosimetry analysis regarding the observed shift from smaller to larger pores when the surfactant template is added to the composition.

Figure 11A:
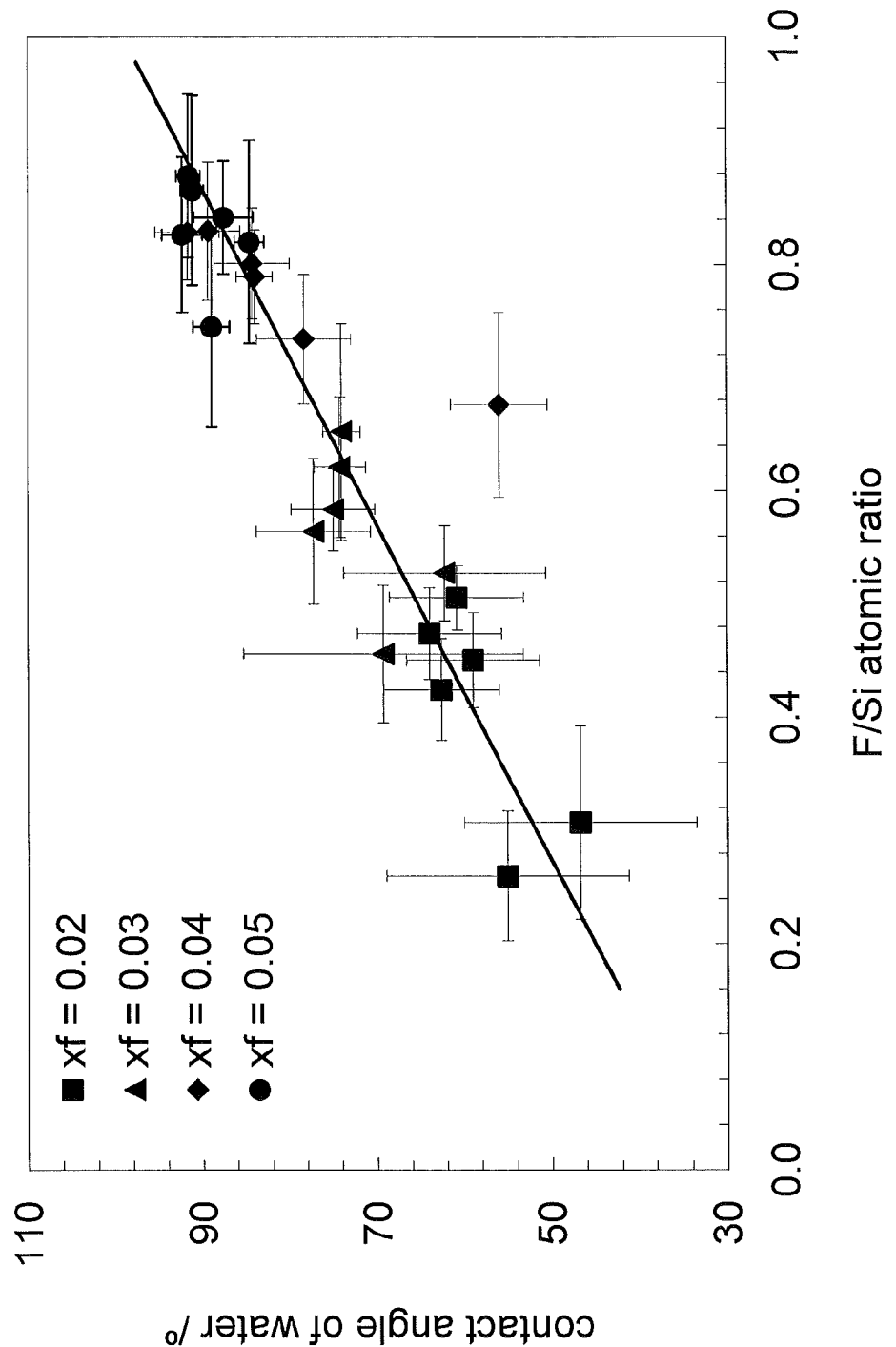
FIG. 11A provides a compilation of bulk contact angle of water versus F/Si atomic ratio for all compositions synthesized. Line is linear best fit to the data.
Figure 11B:
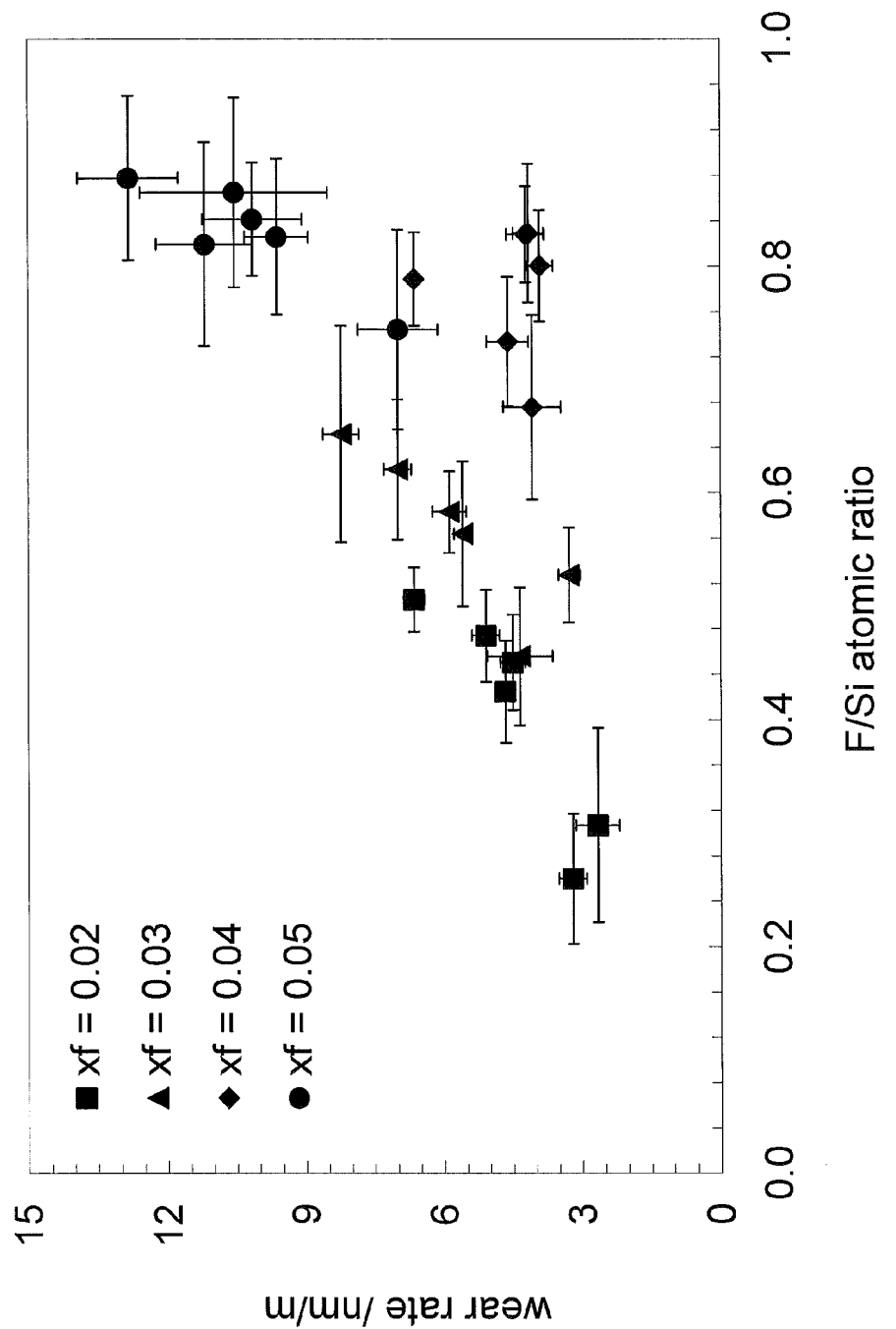
FIG. 11B provides compilation of wear rate versus F/Si atomic ratio for all compositions synthesized.

In designing hydrophobic-oleophobic films for sustained functionality in tribological environments, several factors must be considered. First, non-wetting properties are determined fundamentally through chemical means, so enhancing functionality must be attained through increasing concentration of fluorinated moieties, as shown in FIG. 11B. As discussed above, using surfactants to template the mesostructure enables this encapsulation of surface-segregating moieties, although the surfactant itself tends to accumulate which increases wetting behavior. To create mechanical robust functional materials, consideration must be given to the structural changes induced by varying film composition, such as the changes in the pore size distribution and the need to maintain strong mechanical properties by minimizing void space. Furthermore, the behaviour of the film during tribological contact is complicated by the contribution of functional chemistry to creating a low-friction surface, which tends to reduce wear by abrasion. FIG. 11B shows a compilation of the wear rate behavior versus encapsulation of fluorine. Unlike the data in FIG. 11A, there is no clear linear trend here. The films with low F/Si had low to moderate wear rates and the films with very high F/Si had high wear rates. However, films with moderate F/Si had wear rates relatively unaffected by the F/Si ratio. These data indicate that multiple mechanisms contribute to the mechanical robustness of these mesostructured functional materials.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A coating comprising:
    a silica matrix comprising a surface, wherein the silica matrix comprises:
        a silane;
        an alkoxysilane;
        a surfactant,
            wherein the silane, the alkoxysilane, or the silane and the alkoxysilane comprise a functional group covalently bound to the silicon of the silane and/or the oxygen of the alkoxysilane, wherein the functional group is an alkyl having at least 6 carbon atoms,
            wherein the surfactant is present at a concentration in a range of 2 to 10 weight percent based on the weight of total silanes,
            wherein the silica matrix has an xf in a range of 0.02 to 0.05, where xf is a molar concentration of total silanes and/or alkoxysilanes having the functional group in terms of total silanes,
            wherein the surface has an average water contact angle of 70 degrees or greater and wherein the surface has an average n-hexadecane contact angle of 40 degrees or greater; and
        pores, wherein the pores are encapsulated in the silica matrix, wherein the pores have an interior wall formed by the silica matrix, wherein the pores form voids within the silica matrix, and wherein the functional groups extend into the voids.

2. The coating of claim 1, wherein at least one-functional group of the functional groups is a fluoroalkyl.

3. The coating of claim 2, wherein the at least one fluoroalkyl functional group comprises a perfluoropolyether.

4. The coating of claim 1, wherein the pores have an average pore diameter in a range of 4 to 10 nm.

5. The coating of claim 1, wherein the pores are disordered, and comprise 30 to 60% by volume of the coating.

6. The coating of claim 1, wherein the silica matrix has a hardness in a range of 0.1 to 1.0 GPa, as determined by nanoindentation.

7. The coating of claim 1, wherein the coating has a thickness in a range of 300 to 700 nm.

8. The coating of claim 1, wherein surface has an average contact angle before wear for water of greater than 70° and/or an average contact angle before wear for n-hexadecane of greater than 40°.

9. The coating of claim 1, wherein the coating has an initial coating thickness when unabraded and the average contact angle of the surface is greater than 70° for water and/or greater than 40° for n-hexadecane when the surface is abraded up to 99% of the initial coating thickness.

10. A coating comprising:
    a silica matrix comprising a surface, wherein the silica matrix comprises:
        a silane;
        an alkoxysilane;
        a surfactant,
            wherein the silane, the alkoxysilane, or the silane and the alkoxysilane comprise a functional group covalently bound to the silicon of the silane and/or the oxygen of the alkoxysilane, wherein the functional group is an alkyl having at least 6 carbon atoms,
            wherein the surfactant is present at a concentration in a range of 0 to 10 weight percent based on the weight of total silanes,
            wherein the silanes and/or alkoxysilanes having the functional group are present in a range of 2 to 5 mol % of the total silanes; and
        pores, wherein the pores are encapsulated in the silica matrix, wherein the pores have an interior wall formed by the silica matrix, wherein the pores form voids within the silica matrix, wherein the functional groups extend into the voids, wherein the pores are disordered, and wherein the pores comprise 30 to 60% by volume of the coating.

11. The coating of claim 10, wherein at least one of the functional groups is a fluoroalkyl.

12. The coating of claim 10, wherein the surface has an average water contact angle of 70 degrees or greater and wherein the surface has an average n-hexadecane contact angle of 40 degrees or greater.

13. The coating of claim 1, wherein the xf is 0.04 and the concentration of the surfactant is in a range of 4 to 8 weight percent, based on the weight of total silanes.

14. The coating of claim 13, wherein the xf is 0.04 and the concentration of the surfactant is 8 weight percent, based on the weight of total silanes.

15. The coating of claim 1, wherein silane is a fluorinated silane.

16. The coating of claim 1, wherein the silica matrix comprises perfluoroethersilane (FPES).

17. The coating of claim 16, wherein the silica matrix comprises tetraethoxysileane (TEOS).

18. The coating of claim 1, wherein the silica matrix comprises tetraethoxysileane (TEOS).

19. The coating of claim 10, wherein the surface has an average contact angle before wear for water of greater than 70° and/or an average contact angle before wear for n-hexadecane of greater than 40°.

20. The coating of claim 19, wherein the coating has an initial coating thickness when unabraded and the average contact angle is maintained at greater than 70° for water and/or greater than 40° for n-hexadecane when the surface is abraded up to 99% of the initial coating thickness.

* * * * *